(12) United States Patent
Moriya et al.

(10) Patent No.: US 8,733,959 B2
(45) Date of Patent: May 27, 2014

(54) BACKLIGHT DEVICE AND DISPLAY DEVICE

(75) Inventors: Koji Moriya, Kanagawa (JP); Takeshi Nishi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 13/611,411

(22) Filed: Sep. 12, 2012

(65) Prior Publication Data

US 2013/0003355 A1     Jan. 3, 2013

Related U.S. Application Data

(60) Continuation of application No. 13/417,619, filed on Mar. 12, 2012, now Pat. No. 8,277,068, which is a continuation of application No. 13/116,169, filed on May 26, 2011, now Pat. No. 8,132,931, which is a continuation of application No. 12/794,908, filed on Jun. 7, 2010, now Pat. No. 7,950,816, which is a division of application No. 11/725,316, filed on Mar. 19, 2007, now Pat. No. 7,731,377.

(30) Foreign Application Priority Data

Mar. 21, 2006   (JP) ................................ 2006-077879

(51) Int. Cl.
    *G02F 1/13357*     (2006.01)
(52) U.S. Cl.
    USPC ........... 362/97.3; 362/97.4; 362/231; 349/63; 349/64
(58) Field of Classification Search
    USPC ............. 362/97.1–97.4, 231, 249.02, 249.05, 362/249.06, 84; 349/63–65, 72, 155, 156
    See application file for complete search history.

(56) References Cited

U.S. PATENT DOCUMENTS

| 5,272,535 A | 12/1993 | Elabd |
| 6,009,712 A | 1/2000 | Ito et al. |
| 6,465,268 B2 | 10/2002 | Hirakata et al. |
| 6,638,781 B1 | 10/2003 | Hirakata et al. |

(Continued)

FOREIGN PATENT DOCUMENTS

| CN | 1532613 A | 9/2004 |
| CN | 1622182 A | 6/2005 |

(Continued)

OTHER PUBLICATIONS

Office Action re Chinese application No. CN 200710087893.8, dated Jan. 15, 2010 (with English translation).

(Continued)

*Primary Examiner* — Thomas Sember
(74) *Attorney, Agent, or Firm* — Husch Blackwell LLP

(57) ABSTRACT

It is an object to manufacture a highly reliable backlight device with less color unevenness and less luminance unevenness, and a high-performance and highly reliable display device including the backlight device, which can display a high quality image. A light emitting diode (LED) is used as a light source of a backlight device and thermoelectric elements are provided in a chassis for holding the light emitting diode so as to surround the light emitting diode (the thermoelectric elements are provided under the light emitting diode and on the four sides thereof). A temperature in the backlight device is adjusted by cooling and heating by the thermoelectric elements.

42 Claims, 28 Drawing Sheets

(56) References Cited

U.S. PATENT DOCUMENTS

| | | | |
|---|---|---|---|
| 6,738,113 | B2 | 5/2004 | Yu et al. |
| 6,963,382 | B1 | 11/2005 | Yamazaki et al. |
| 7,136,582 | B2 | 11/2006 | Hayami et al. |
| 7,193,356 | B2 | 3/2007 | Kokubo et al. |
| 7,239,084 | B2 | 7/2007 | Kato et al. |
| 7,248,330 | B2 | 7/2007 | Ishii et al. |
| 7,258,816 | B2 | 8/2007 | Tamaki et al. |
| 7,275,851 | B2 | 10/2007 | Sakurai |
| 7,297,293 | B2 | 11/2007 | Tamaki et al. |
| 7,324,174 | B2 | 1/2008 | Hafuka et al. |
| 7,344,291 | B2 | 3/2008 | Hatanaka et al. |
| 7,542,109 | B2 | 6/2009 | Jang et al. |
| 7,556,744 | B2 | 7/2009 | Tamaki et al. |
| 7,572,036 | B2 | 8/2009 | Yoon et al. |
| 7,593,069 | B2 | 9/2009 | Oh et al. |
| 7,597,823 | B2 | 10/2009 | Tamaki et al. |
| 7,612,377 | B2 | 11/2009 | Moon et al. |
| 7,633,090 | B2 | 12/2009 | Ishii |
| 7,663,730 | B2 | 2/2010 | Shibata |
| 7,690,805 | B2 | 4/2010 | Kubota et al. |
| 7,789,527 | B2 | 9/2010 | Matsumoto et al. |
| 7,791,274 | B2 | 9/2010 | Yano et al. |
| 7,964,113 | B2 | 6/2011 | Tamaki et al. |
| 8,058,793 | B2 | 11/2011 | Tamaki et al. |
| 8,076,847 | B2 | 12/2011 | Tamaki et al. |
| 8,334,942 | B2 | 12/2012 | Aoki |
| 8,405,307 | B2 | 3/2013 | Yano et al. |
| 2004/0222467 | A1* | 11/2004 | Yamazaki et al. ............. 257/351 |
| 2005/0002260 | A1* | 1/2005 | Koyama ........................ 365/222 |
| 2005/0122065 | A1 | 6/2005 | Young |
| 2006/0012989 | A1 | 1/2006 | Lee |
| 2006/0028603 | A1 | 2/2006 | Lee et al. |
| 2006/0237737 | A1 | 10/2006 | Lee |
| 2007/0035950 | A1 | 2/2007 | Yang |
| 2007/0047228 | A1 | 3/2007 | Thompson et al. |
| 2007/0047261 | A1 | 3/2007 | Thompson et al. |
| 2007/0120138 | A1 | 5/2007 | Sayers et al. |
| 2007/0188082 | A1 | 8/2007 | Kato et al. |
| 2008/0068836 | A1 | 3/2008 | Hatanaka et al. |
| 2009/0303220 | A1 | 12/2009 | You et al. |

FOREIGN PATENT DOCUMENTS

| | | |
|---|---|---|
| EP | 1 752 703 A1 | 2/1999 |
| EP | 1 433 831 A1 | 6/2004 |
| EP | 1 463 129 A2 | 9/2004 |
| EP | 1 785 764 A1 | 5/2007 |
| JP | 6-324304 | 11/1994 |
| JP | 7-175035 | 7/1995 |
| JP | 10-247750 | 9/1998 |
| JP | 11-54848 | 2/1999 |
| JP | 2001-43728 | 2/2001 |
| JP | 2001-346002 | 12/2001 |
| JP | 2002-270020 | 9/2002 |
| JP | 2003-29262 | 1/2003 |
| JP | 2003-131191 | 5/2003 |
| JP | 2004-6193 | 1/2004 |
| JP | 2004-71726 | 3/2004 |
| JP | 2004-283304 | 10/2004 |
| JP | 2005-77468 | 3/2005 |
| JP | 2005-106974 | 4/2005 |
| JP | 2005-164710 | 6/2005 |
| JP | 2005-183005 | 7/2005 |
| JP | 2005-227542 | 8/2005 |
| JP | 2005-321727 | 11/2005 |
| JP | 2005-331644 | 12/2005 |
| JP | 2006-32902 | 2/2006 |
| JP | 2006-49098 | 2/2006 |
| JP | 2006-58484 | 3/2006 |
| JP | 2006-58487 | 3/2006 |
| KR | 10-2004-0091681 | 9/2007 |
| TW | 200403497 | 3/2004 |
| TW | 200512511 | 4/2005 |
| TW | 200631182 | 9/2006 |
| WO | WO 2005/067066 A1 | 7/2005 |
| WO | WO 2006/093029 A1 | 9/2006 |

OTHER PUBLICATIONS

Office Action re Chinese application No. CN 200710087893.8, dated Jul. 7, 2010 (with English translation).

Office Action re Taiwanese application No. TW 096109504, dated Jun. 24, 2013 (with English translation).

Office Action re Taiwanese application No. TW 100119979, dated Nov. 19, 2013 (wit English translation).

* cited by examiner

BACKLIGHT DEVICE AND DISPLAY DEVICE

This application is a continuation of application Ser. No. 13/417,619 filed on Mar. 12, 2012 now U.S. Pat. No. 8,277,068 which is a continuation of application Ser. No. 13/116,169 filed on May 26, 2011 (now U.S. Pat. No. 8,132,931 issued Mar. 13, 2012) which is a continuation of application Ser. No. 12/794,908 filed on Jun. 7, 2010 (now U.S. Pat. No. 7,950,816 issued May 31, 2011) which is a divisional of application Ser. No. 11/725,316 filed on Mar. 19, 2007 (now U.S. Pat. No. 7,731,377 issued Jun. 8, 2010).

BACKGROUND OF THE INVENTION

1. Field of the Invention

The present invention relates to a backlight device, and a display device including a liquid crystal element, provided with the backlight device.

2. Description of the Related Art

Nowadays, a liquid crystal display device is used in a wide range of fields such as a liquid crystal television, a PDA, a mobile phone, and office automation equipment like a personal computer, as well as a clock and a calculator.

In a liquid crystal display device, liquid crystal is sealed between two light-transmitting substrates. When voltage is applied, a direction of liquid crystal molecules is changed and light transmittance thereof is changed, so that a predetermined image or the like is displayed optically. Since liquid crystal does not emit light by itself, a backlight unit serving as a light source is provided on the back of a liquid crystal display panel. The backlight unit includes a light source, a light guide plate, a reflective film, a prism film, a diffusing film, and the like, and supplies light to display an image or the like to the entire surface of the liquid crystal display panel uniformly.

As the light source in the backlight unit, a cold cathode fluorescent lamp in which mercury or xenon is sealed in a fluorescent tube is generally used.

A light source in a backlight device as described above has luminance which changes according to an ambient temperature and there is a case such that luminance of the light source is decreased because of rise in temperature due to its own heat generation. Therefore, in order to make a temperature of the light source an optimum driving temperature, a measure for releasing heat such as a heat sink, a heat pipe, or air cool by a cooling fan is tried. As one of measures for releasing heat, a method in which a fluorescent tube has a Peltier element and cooling is carried out by the Peltier element is given (for example, see Patent Document 1: Japanese Published Patent Application No. H6-324304 and Patent Document 2: Japanese Published Patent Application No. H7-175035).

SUMMARY OF THE INVENTION

A white light emitting diode or high output. RGB light emitting diodes are used recently, and high output RGB light emitting diodes have a characteristic such that a driving voltage thereof is high and luminance is low when being driven at high temperature. In particular, a red light emitting diode largely depends on a temperature. Further, in a light emitting diode backlight unit, when a plurality of high output RGB light emitting diodes are used, a large amount of heat is generated.

Due to such heat generation, reduction in life time and luminance, chromaticity shift, and the like are occurred in the light emitting diode, and transformation, alteration, and the like of a diffusing film, a reflective film, a prism film, and the like are occurred in the backlight unit.

Further, since a liquid crystal display panel is located in front of the backlight unit, a temperature of the backlight unit influences the liquid crystal display panel to no small extent. Accordingly, effect on characteristics of the liquid crystal display panel, such as response speed, contrast, or color unevenness; and transformation, alteration, deterioration in characteristics, or the like of a polarizing film, a wide view film, a retardation film, and the like are occurred.

To suppress the heat generation, the foregoing measure for releasing heat is taken. However, there is a problem in any method, such that the measure for releasing heat is not sufficient, the backlight unit becomes thicker, or the like.

In view of the foregoing, it is an object of the present invention to manufacture a highly reliable backlight device with less color unevenness and less luminance unevenness, and a high-performance and highly reliable display device including the backlight device, which can display high quality image.

In the present invention, a light emitting diode (hereinafter, also referred to as LED) is used as a light source of a backlight device (also referred, to as a backlight or a lighting device) and thermoelectric elements are provided in a chassis for holding the light emitting diode so that the thermoelectric elements surround the light emitting diode (the thermoelectric elements are provided under the light emitting diode and on the four sides thereof). A temperature in the backlight device is adjusted by cooling and heating by the thermoelectric elements. The thermoelectric element refers to an element of metal or semiconductor which converts heat energy to and from electric energy with use of a phenomenon relating heat and electricity. As an example of the thermoelectric element which can be used in the present invention, a Peltier element can be given.

When light is emitted from the light emitting diode, the temperature in the backlight device changes. A temperature sensor is provided in the backlight device to monitor a temperature condition, the thermoelectric element carries out cooling or heating by a driving circuit for driving the thermoelectric element, and the temperature is controlled with a temperature controller. Further, a color sensor for monitoring output of the light emitting diode is provided, and the output of the light emitting diode is controlled by a light emitting diode controlling device for controlling the output of the light emitting diode. The light emitting diode is driven by a light emitting diode driving circuit.

A transmissive liquid crystal display panel module, which is provided in front of the backlight device, may also include a thermoelectric element for heating and cooling the liquid crystal display panel, a driving circuit for driving the thermoelectric element, a temperature sensor for monitoring a temperature condition of the (color) liquid crystal display panel, and a temperature controller for controlling the temperature.

A temperature sensor and a temperature controller may be provided for each of the thermoelectric element provided in the backlight device and the thermoelectric element provided in the liquid crystal display panel module so that the thermoelectric elements can be independently operated. Alternatively, the temperature sensor and the temperature controller may be provided to be shared so that the thermoelectric elements are operated together.

The backlight device and the liquid crystal display panel module may be located to be in contact with each other or to have a gap therebetween. In a case where the liquid crystal display panel module and the backlight device are provided to be in contact with each other and the thermoelectric element provided in the backlight device is in contact with the liquid crystal display panel module, a temperature of the liquid crystal display panel module can be also controlled by cooling and heating by the thermoelectric element.

In addition, a thermoelectric module may be provided in a liquid crystal display device to utilize temperature variation in the liquid crystal display device for driving another light emitting diode, a thermoelectric element, and the like. Since a thermoelectric element which can carry out cooling and heating efficiently is included in a chassis in the present invention, desired temperature variation is easily obtained in the liquid crystal display device.

A mode of a backlight device of the present invention includes a plurality of light emitting diodes located in a chassis having a thermoelectric element, in which the chassis having the thermoelectric element is provided so as to surround the plurality of light emitting diodes.

A mode of a backlight device of the present invention includes a first light emitting diode, a second light emitting diode, and a third light emitting diode located in a chassis having a thermoelectric element; in which the chassis having the thermoelectric element is provided so as to surround the first, the second, and the third light emitting diodes; an emission color of the first light emitting diode is red; an emission color of the second light emitting diode is green; and an emission color of the third light emitting diode is blue.

A mode of a backlight device of the present invention includes a first light emitting diode, a second light emitting diode, and a third light emitting diode located in a chassis having a thermoelectric element; in which the chassis having the thermoelectric element is provided so as to surround the first, the second, and the third light emitting diodes; the first light emitting diode has a peak in wavelength of an emission color at 625 nm±10 nm; the second light emitting diode has a peak in wavelength of an emission color at 530 nm±15 nm; and the third light emitting diode has a peak in wavelength of an emission color at 455 nm±10 nm.

A mode of a display device of the present invention includes a back light device having a plurality of light emitting diodes located in a chassis having a thermoelectric element, and a display module; in which the chassis having the thermoelectric element is provided so as to surround the plurality of light emitting diodes.

A mode of a display device of the present invention includes a back light device having a plurality of light emitting diodes located in a chassis having a Peltier element, and a display module; in which the chassis having the Peltier element is provided so as to surround the plurality of light emitting diodes.

A mode of a display device of the present invention includes a back light device having a plurality of light emitting diodes located in a chassis having a first thermoelectric element, and a display module having a second thermoelectric element; in which the chassis having the first thermoelectric element is provided so as to surround the plurality of light emitting diodes.

A mode of a display device of the present invention includes a back light device having a plurality of light emitting diodes located in a chassis having a first Peltier element, and a display module having a second Peltier element; in which the chassis having the first Peltier element is provided so as to surround the plurality of light emitting diodes.

As a plurality of light emitting diodes used in the present invention, light emitting diodes which emit light of different colors can be used. For example, a red light emitting diode, a green light emitting diode, and a blue light emitting diode can be included. In specific, a plurality of light emitting diodes can include a first light emitting diode having a peak in wavelength of an emission color at 625 nm±10 nm, a second light emitting diode having a peak in wavelength of an emission color at 530 nm±15 nm, and a third light emitting diode having a peak in wavelength of an emission color at 455 nm±10 nm.

With the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel can also be suppressed. Also, since a heat sink, a heat pipe, a cooling fan, and the like are not required, the backlight device can be thinned.

Since light emitting diodes of three primary colors of light are used, color temperature can be easily adjusted and also, a color reproducibility range can be widened compared with a cold cathode fluorescent lamp. Further, with use of the light emitting diode, a temperature range in which the display device can be used becomes wider and a moving picture can be easily displayed since a response speed becomes high. Also, driving by low voltage becomes possible, an inverter is not required, a contrast can be improved, and mercury is not used, which is good for the environment.

Therefore, with the present invention, a highly reliable backlight device with less color unevenness and less luminance unevenness, and a high-performance and highly reliable display device including the backlight device, which can display a high quality image, can be manufactured.

DETAILED DESCRIPTION OF THE INVENTION

Figure 1A:
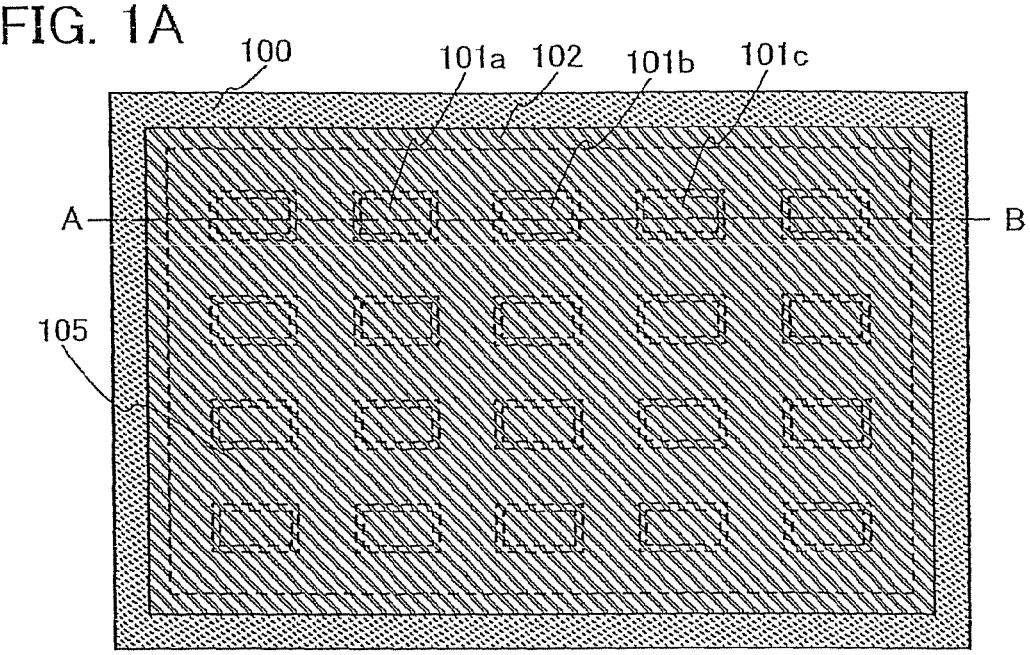
FIGS. 1A to 1C are a top view and cross-sectional views showing a display device of the present invention.

Hereinafter, embodiment modes of the present invention are described with reference to the accompanying drawings. The present invention can be carried out in many different modes, and it is easily understood by those skilled in the art that modes and details can be modified in various ways without departing from the purpose and the scope of the present invention. Accordingly, the present invention should not be interpreted as being limited to the description of the embodiment modes to be given below. Note that like portions in the drawings for describing embodiment modes are denoted by the like reference numerals and repeated explanations thereof are omitted.

Embodiment Mode 1

In this embodiment mode, a concept of a backlight device (also referred to as a backlight or a lighting device) and a display device provided with the backlight. device of the present invention is described.

In the present invention, a light emitting diode (LED) is used as a light source of a backlight device and thermoelectric elements are provided in a chassis for holding the light emitting diode so that the thermoelectric elements surround the light emitting diode (under the light emitting diode and on the four sides thereof). A temperature in the backlight device is adjusted by cooling and heating by the thermoelectric elements. The thermoelectric element refers to an element of metal or semiconductor which converts heat energy to and from electric energy with use of a phenomenon relating heat and electricity. As an example of a thermoelectric element which can be used in the present invention, a Peltier element can be given.

Figure 1B:
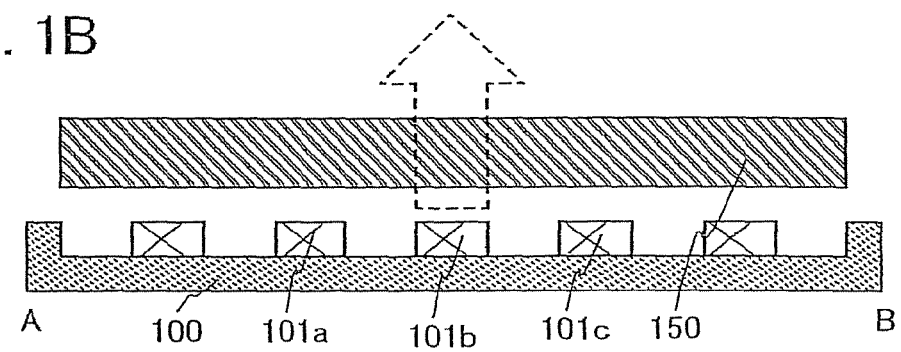
Figure 1C:
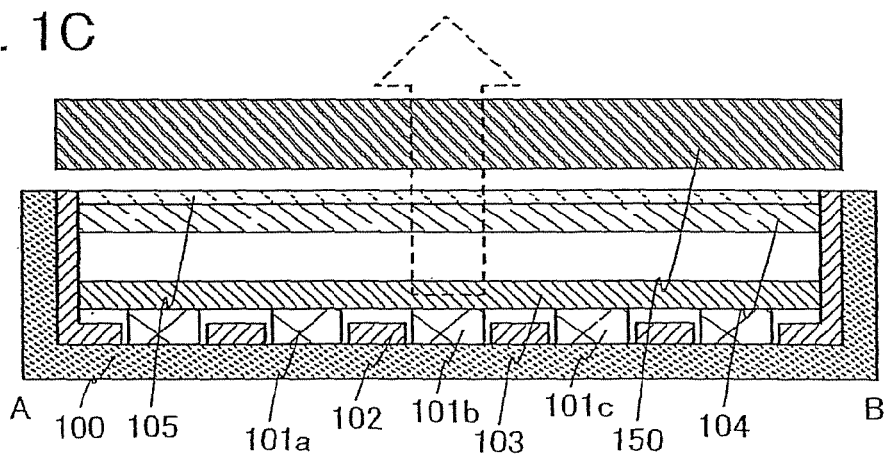

FIG. 1A is a top view of a display device which is provided with a backlight unit having a thermoelectric element which uses a light emitting diode (hereinafter, also referred to as LED) as a light source. FIGS. 1B and 1C are cross-sectional views taking along a line A-B in FIG. 1A. FIG. 1B is a schematic diagram which is simplified and FIG. 1C shows the example in detail. A display device of the present invention is a liquid crystal display device including a liquid crystal display element Since liquid crystal does not emit light by itself, a backlight unit is located on the back of a liquid crystal display panel 150 as a light source.

In FIGS. 1A to 1C, light emitting diodes 101a to 101c are included in a chassis 100 having a thermoelectric element. The backlight unit includes the light emitting diode 101a which is a red light emitting diode, having a peak at 625 nm±10 nm, the light emitting diode 101b which is a green light emitting diode having a peak at 530 nm±15 nm, and the light emitting diode 101c which is a blue light emitting diode having a peak at 455 nm±10 nm. Light emitted from the light emitting diodes 101a to 101c passes through the liquid crystal display panel 150 in a direction shown by arrows in FIGS. 1B and 1C and is emitted to a viewing side. The chassis 100 having a thermoelectric element of the present invention is provided so as to surround at least three sides of the light emitting diodes 101a to 101c like a box. With the liquid crystal display panel 150 located over the chassis 100 having a thermoelectric element, the light emitting diodes 101a to 101c are provided in a box-shaped closed space formed by the chassis 100 having a thermoelectric element and the liquid crystal display panel 150.

As shown in FIG. 1C, the reflective sheet 102 is provided so as to cover the chassis 100 having a thermoelectric element and reflects light from the light emitting diodes 101a to 101c. The light guide plate 103 is located just over the light emitting diodes 101a to 101c and the diffusing plate 104 and the prism sheet 105 are located thereover with a certain distance therebetween.

The light emitting diodes 101a to 101c are controlled to have a certain temperature by the chassis 100 having a thermoelectric element having function of heating and cooling. The chassis 100 having a thermoelectric element of the present invention is provided so as to surround four sides of the light emitting diodes 101a to 101c. Accordingly, not only the vicinity of the light emitting diodes 101a to 101c, but also the whole backlight unit can be cooled or heated efficiently; therefore, a temperature can be accurately controlled with less unevenness.

When light is emitted from the light emitting diode, the temperature in the backlight device changes. A temperature sensor is provided in the backlight device to monitor a temperature condition, the thermoelectric element carries out cooling or heating by a driving circuit for driving the thermoelectric element, and the temperature is controlled with a temperature controller. Further, a color sensor for monitoring output of the light emitting diode is provided, and the output of the light emitting diode is controlled by a light emitting diode controlling device for controlling the output of the light emitting diode. The light emitting diode is driven by a light emitting diode driving circuit. As the color sensor and the temperature sensor, a color sensor and a temperature sensor including an IC chip can be used. At this time, the color sensor and the temperature sensor may be preferably located so that they can be hidden in a chassis portion of the display device.

A transmissive liquid crystal display panel module, which is provided in front of the backlight device, may also include a thermoelectric element for heating and cooling the liquid crystal display panel, a driving circuit for driving the thermoelectric element, a temperature sensor for monitoring a temperature condition of the (color) liquid crystal display panel, and a temperature controller for controlling the temperature.

A temperature sensor and a temperature controller may be provided for each of the thermoelectric element provided in the backlight device and the thermoelectric element provided in the liquid crystal display panel module so that the thermoelectric elements can be independently operated. Alternatively, the temperature sensor and the temperature controller may be provided to be shared so that the thermoelectric elements are operated together.

The backlight device and the liquid crystal display panel module may be located to be in contact with each other or to have a gap therebetween. In a case where the liquid crystal display panel module and the backlight device are provided to be in contact with each other and the thermoelectric element provided in the backlight device is in contact with the liquid crystal display panel module, a temperature of the liquid crystal display panel module can be also controlled by cooling and heating by the thermoelectric element.

In addition, a thermoelectric module may be provided in the liquid crystal display device to utilize temperature variation in the liquid crystal display device for driving another light emitting diode, a thermoelectric element, and the like. Since a thermoelectric element which can carry out cooling and heating efficiently is included in the chassis in the present invention, desired temperature variation is easily obtained in the liquid crystal display device.

The backlight unit can include various colors of light emitting diode (LED), such as red, green, blue, and white, as a light source. When various colors of light emitting diodes (LEDs) are used, color reproducibility can be improved. Further, in a case where light emitting diodes (LEDs) of RGB are used as a light source, the number and arrangement of the light emitting diodes of each color are not necessarily the same. For example, the number of light emitting diodes of a color with low emission intensity (such as green) may be larger than the number of light emitting diode of another color.

When a field sequential mode is applied in a case of using the light emitting diodes of RGB, color display can be carried out by sequentially lighting the light emitting diodes of RGB as time passes.

The light emitting diode is suitable for a large display device since luminance thereof is high. In addition, color reproducibility of the light emitting diode is superior to that of a cold cathode fluorescent tube because color purity of each color of RGB is favorable. An area in which light emitting diodes are located can be reduced; therefore, a narrower frame can be realized when the light emitting diode is applied to a small display device.

Further, for example, when a backlight device including a light emitting diode is mounted on a large display device, the light emitting diode can be located on the back of a substrate of the display device. In this case, the light emitting diodes can be arranged with predetermined gaps therebetween so that the colors thereof are sequentially arranged. Color reproducibility can be improved due to the arrangement of the light emitting diodes.

The backlight device including a light emitting diode is particularly suitable for a large display device, and a high quality image can be provided even in a dark place by enhancing a contrast ratio of the large display device.

Figure 2A:
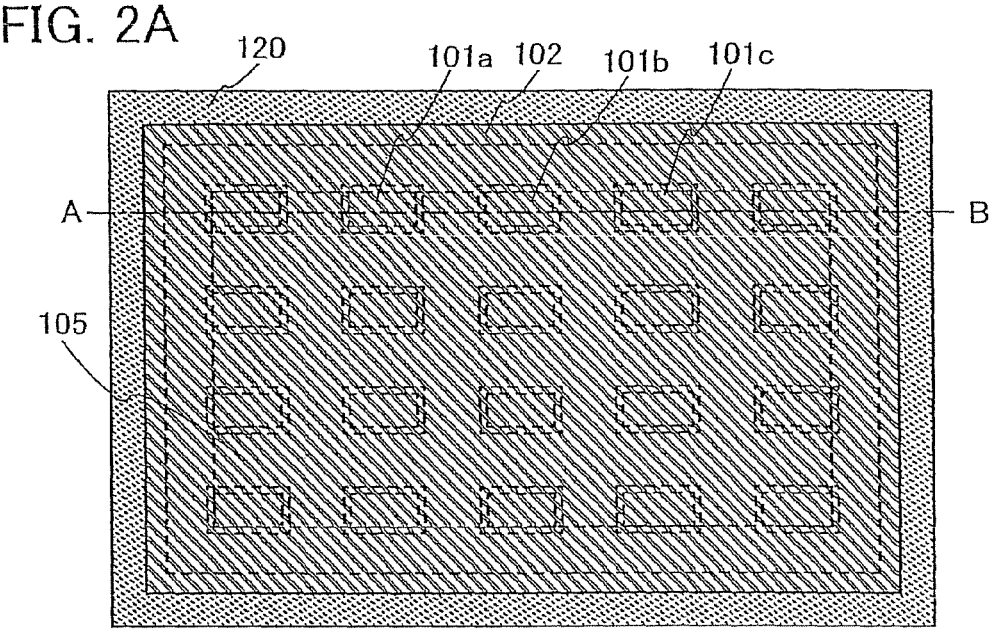
FIGS. 2A to 2C are a top view and cross-sectional views showing a display device of the present invention.
Figure 2B:
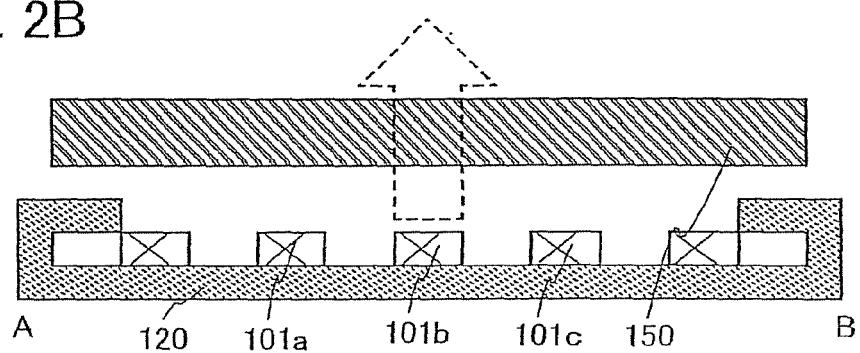
Figure 2C:
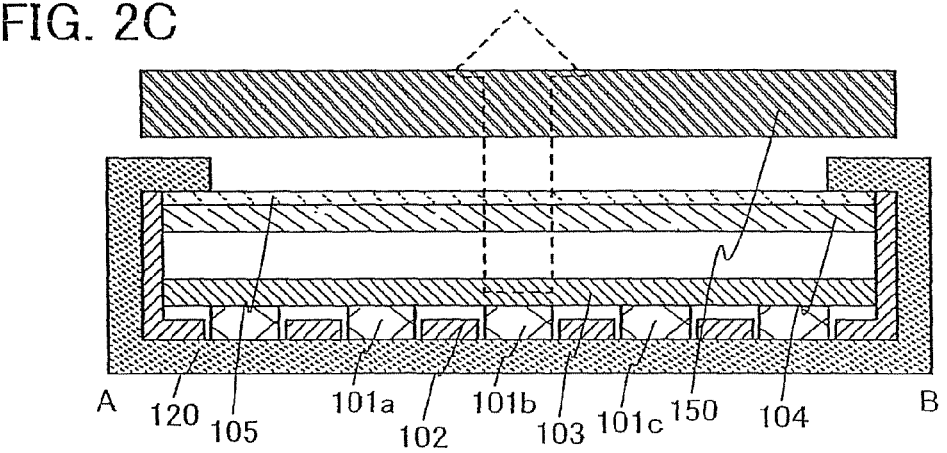
Figure 3A:
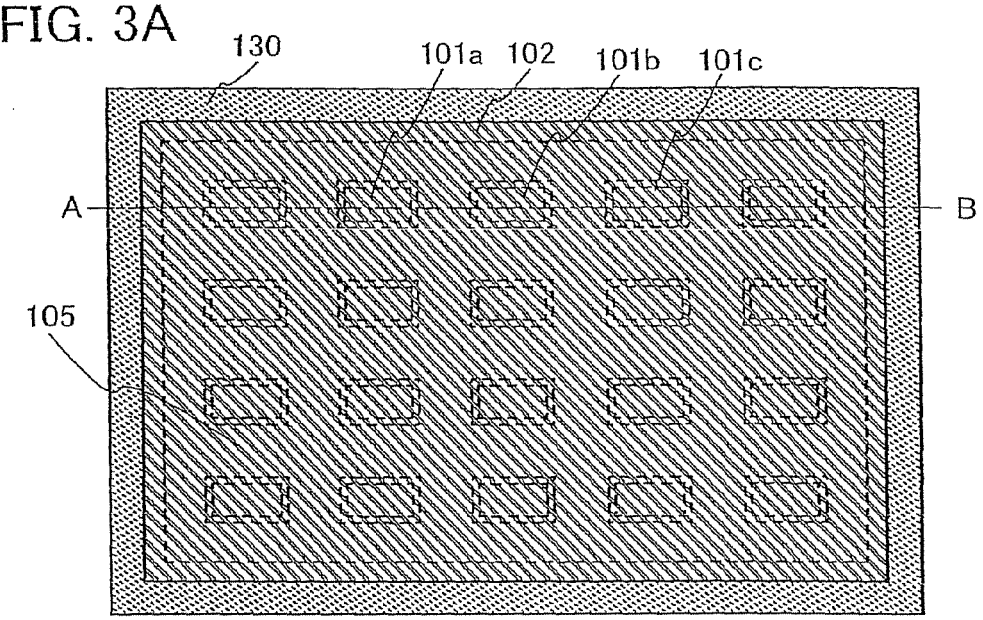
FIGS. 3A to 3C are a top view and cross-sectional views showing a display device of the present invention.
Figure 3B:
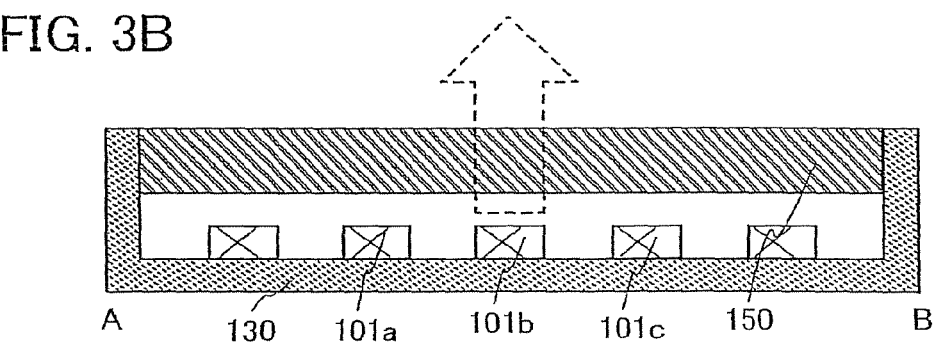
Figure 3C:
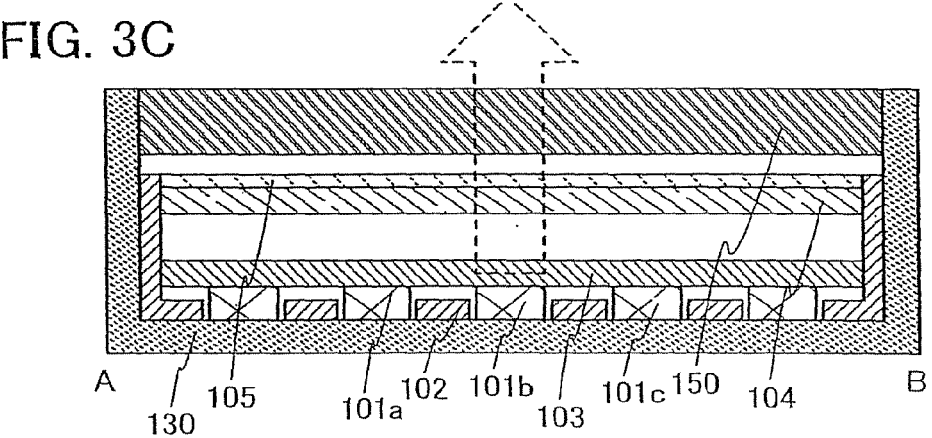

FIGS. 2A to 2C show a chassis having a thermoelectric element with a different shape. As shown in FIGS. 2A to 2C, a part of the chassis having a thermoelectric element may be provided on the display panel side to which light is emitted from the backlight unit. When a chassis 120 having a thermoelectric element is provided so as to surround the backlight device, the whole backlight unit can be cooled or heated more efficiently; therefore, a temperature can be accurately controlled with less unevenness.

Figure 24A:
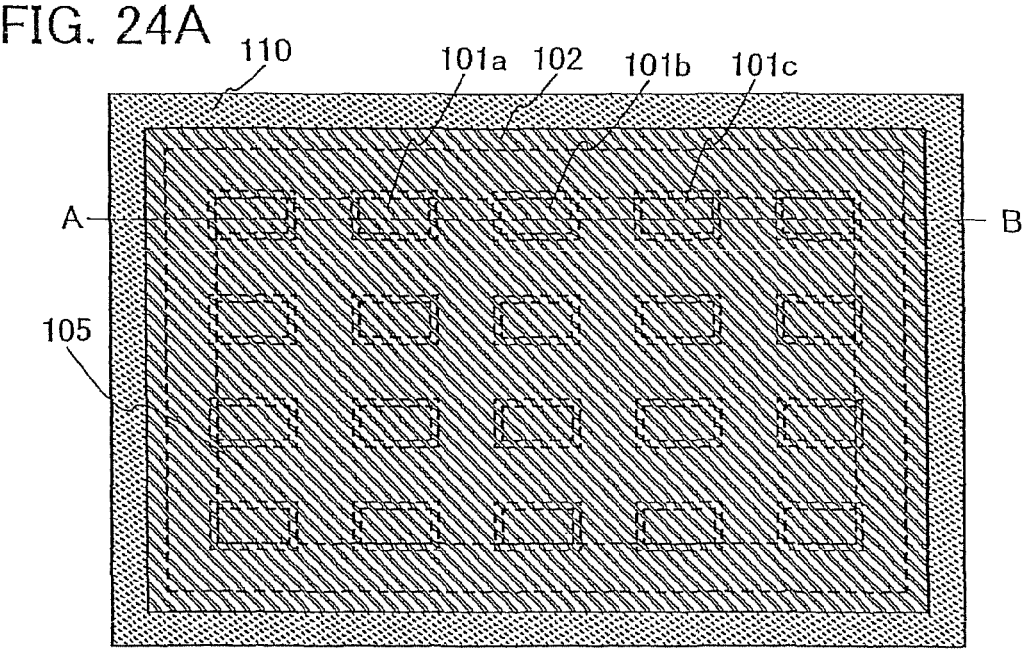
FIGS. 24A to 24C are a top view and cross-sectional views showing a display device of the present invention.
Figure 24B:
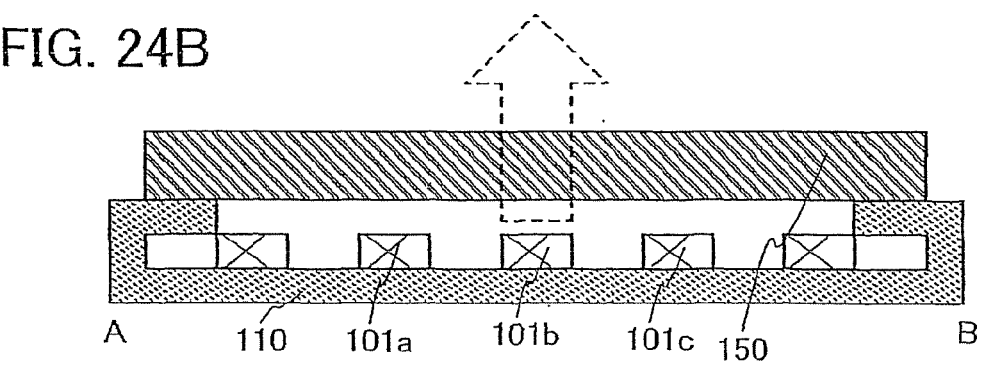
Figure 24C:
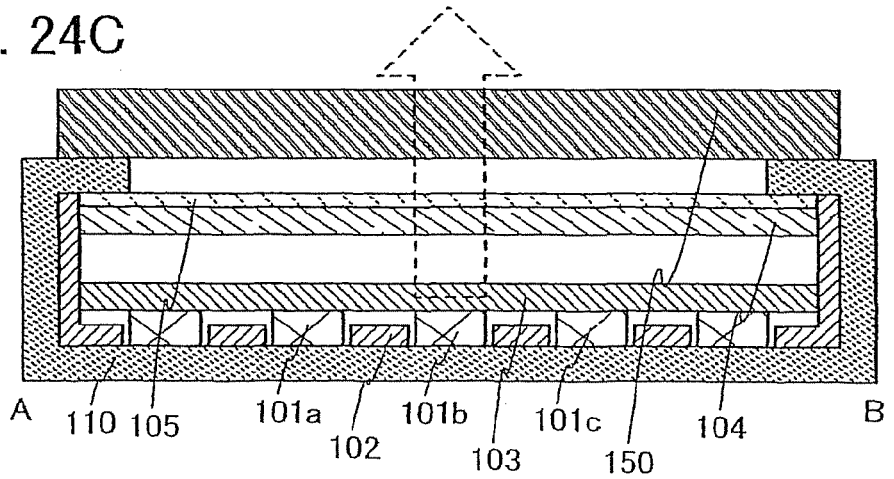

Further, the backlight unit and a display panel may be provided in contact with each other in order to thin the display device. In a display device shown in FIGS. 24A to 24C, a chassis having a thermoelectric element provided in the backlight unit is partially in contact with the display panel. When the backlight device and the display panel are provided in contact with each other (or they are provided extremely close to each other and partially in contact with each other), the display panel is easily influenced by change in temperature in the backlight device. When the thermoelectric element included in the chassis is provided in contact with the display panel, the display panel side is also cooled or heated, and the temperature thereof can be controlled.

Figure 4A:
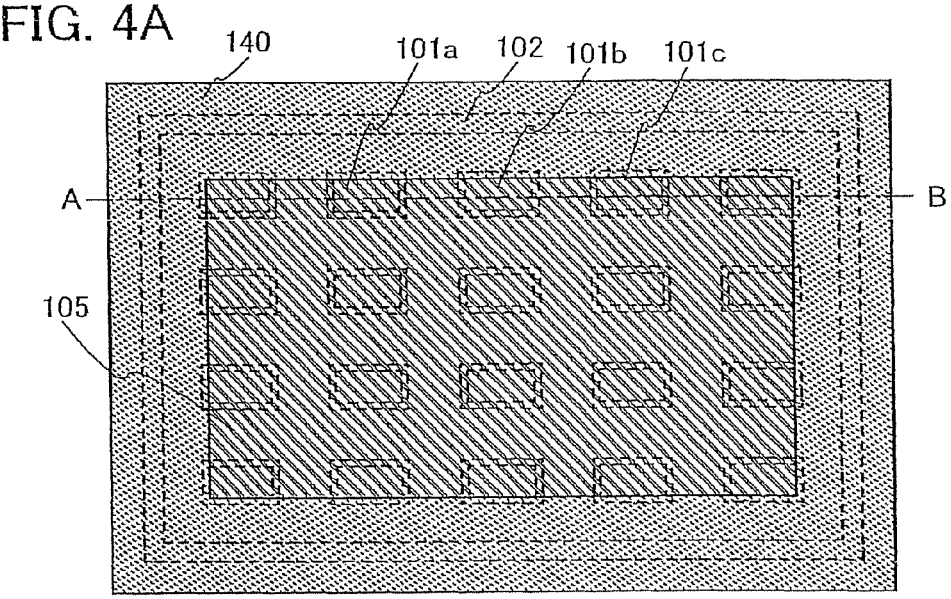
FIGS. 4A to 4C are a top view and cross-sectional views showing a display device of the present invention.
Figure 4B:
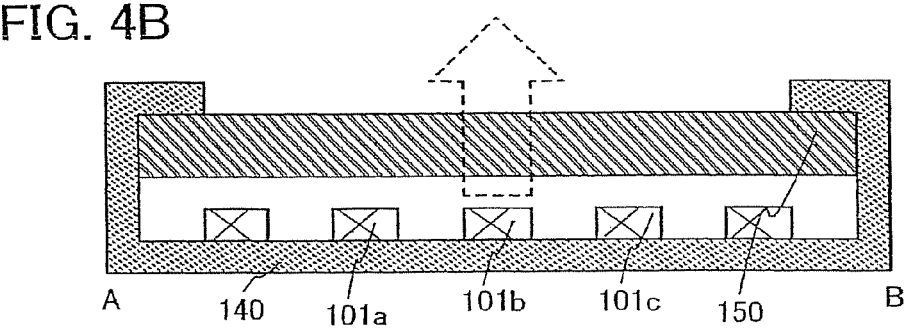
Figure 4C:
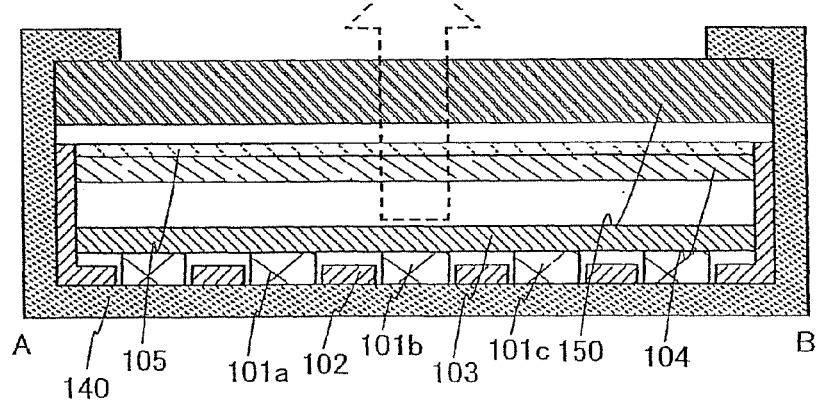

FIGS. 3A to 4C show the chassis having a thermoelectric element with different shapes. FIGS. 3A to 4C show examples of chassis 130 and 140 having a thermoelectric element provided in contact with both the backlight unit and the display panel. FIGS. 4A to 4C show a structure in which the chassis 140 having a thermoelectric element covers a part of a viewing side, as shown in FIGS. 2A to 2C, and the chassis wraps the backlight unit and the display panel. As shown in FIGS. 3A to 4C, the chassis having a thermoelectric element may cover the backlight unit and the display panel continuously or the chassis having a thermoelectric element may be provided separately in a backlight unit region and in a display panel region.

Figure 5A:
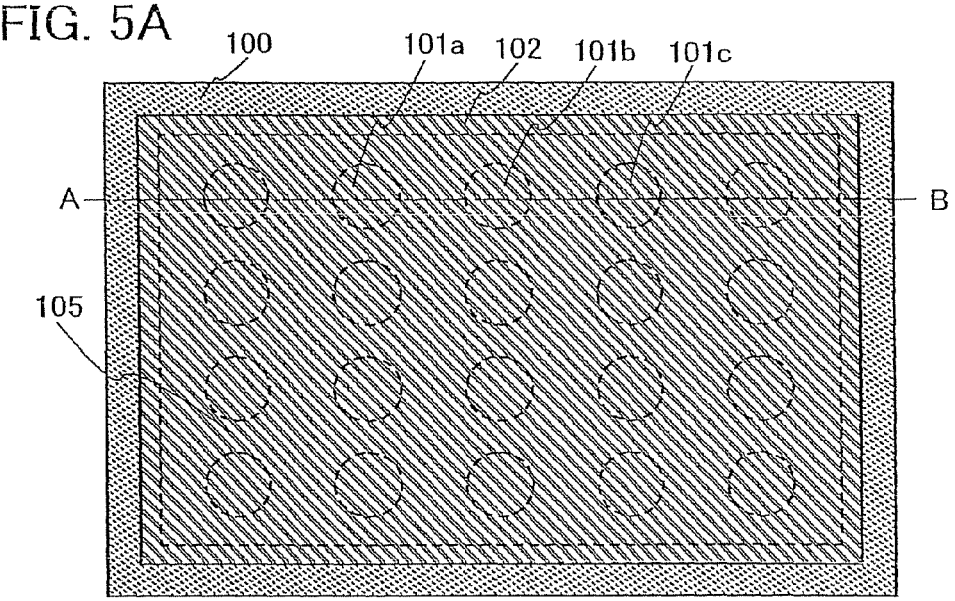
FIGS. 5A to 5C are a top view and cross-sectional views showing a display device of the present invention.
Figure 5B:
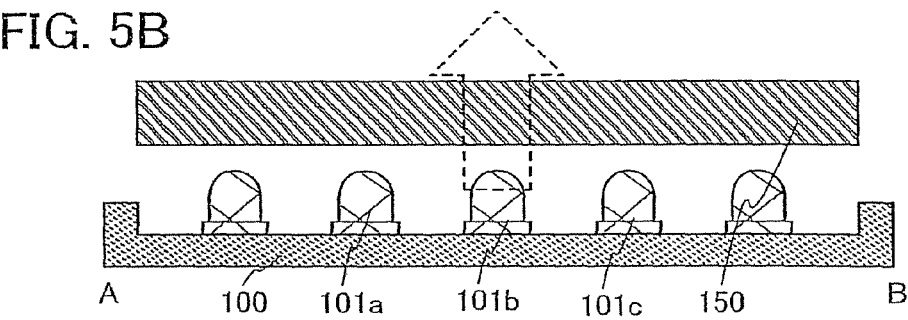
Figure 5C:
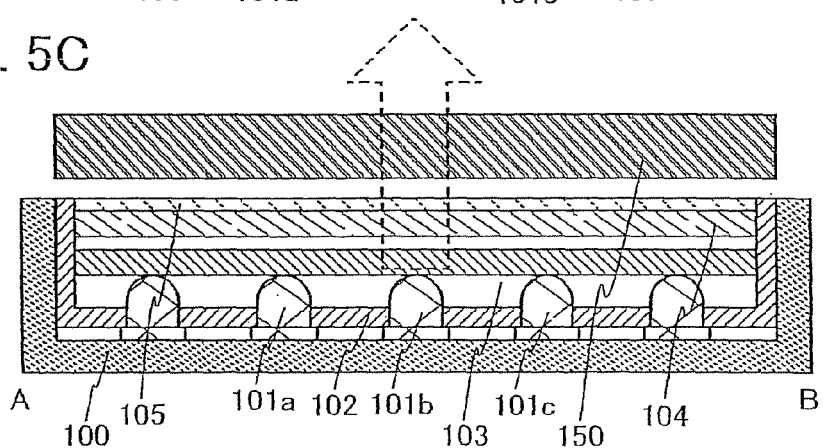

In addition, the light emitting diode used in the present invention may be covered with a resin or the like. As shown in FIGS. 5A to 5C, a dome-shaped (hemispherical) resin cover which diffuses light may be provided around the light emitting diode. A shape of the resin cover is not limited and may be a reverse taper shape.

In addition, a liquid crystal display panel module may be any one of following modes: a TN (Twisted Nematic) mode, an IPS (In-Plane-Switching) mode, a FFS (Fringe Field Switching) mode, a MVA (Multi-domain Vertical Alignment) mode, a PVA (Patterned Vertical Alignment) mode, an ASM (Axially Symmetric aligned Micro-cell) mode, an OCB (Optical Compensated Birefringence) mode, a FLC (Ferroelectric Liquid Crystal) mode, or an AFLC (Anti Ferroelectric Liquid Crystal) mode.

With the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a. retardation film, and the like used in the liquid crystal display panel can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

Embodiment Mode 2

In this embodiment mode, a backlight device using the present invention and a display device including the backlight device are described in detail.

Figure 6:
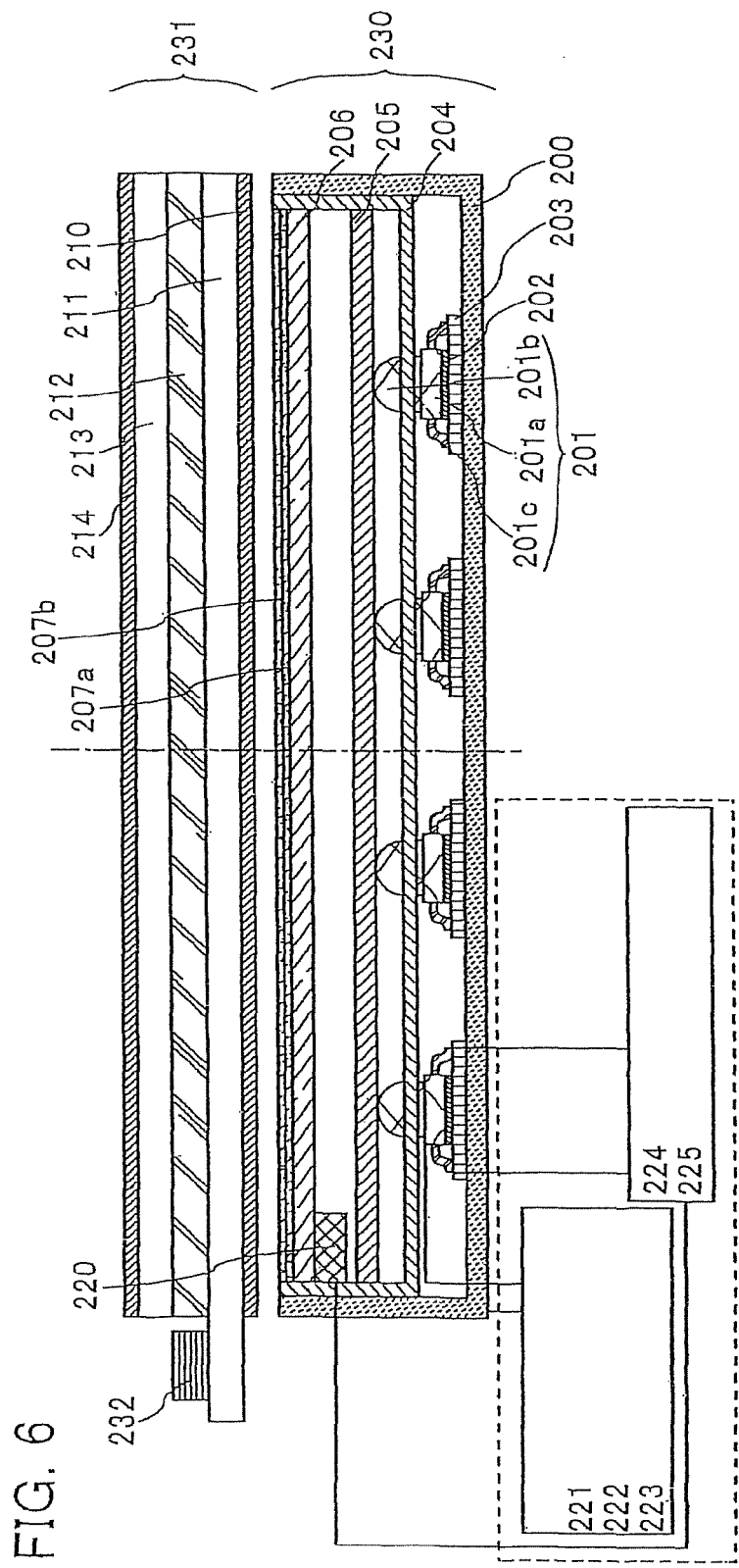
FIG. 6 shows a display device of the present invention.

A display device shown in FIG. 6 includes a backlight unit 230 including a light emitting diode 201 (a light emitting element 201a, a cover 201b, and a terminal 201c), a thermal conductive layer 202 serving as a thermal conductive adhesive agent, a metal core substrate 203, a chassis 200 having a thermoelectric element, a reflective sheet 204, a light guide plate 205, a diffusing plate 206, prism sheets 207a and 207b, and a color sensor 220, and also includes a liquid crystal display panel 231 including a substrate 211, a layer 212 including a display element, a substrate 213, polarizing plates 214 and 210, and a liquid crystal display panel driving circuit 232. The backlight unit 230 further includes a temperature sensor 221 in a backlight unit region, a temperature controller 222, a thermoelectric element driving circuit 223, a light emitting diode controlling device 224, and a light emitting diode driving circuit 225.

A metal core substrate is a substrate in which a metal core is provided in an intermediate layer of the substrate and has characteristics such as thermal uniformity, improved mechanical strength, a shielding property, and the like. Since the metal core substrate has favorable heat conduction, it is easy to have a structure in which heat is concentrated on the metal core and is released at a time.

Although the light emitting diode shown in FIG. 6 has the dome-shaped cover 201b, a shape of the light emitting diode is not limited thereto. It may be a reverse-tapered shape. Alternatively, a plurality of light emitting diodes may be covered with a resin. FIGS. 18A to 18D show an example of a light emitting diode which can be applied to the present invention.

Figure 18A:
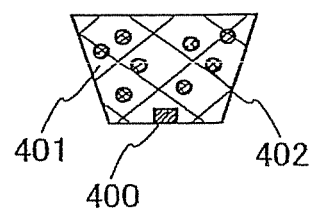
FIGS. 18A to 18D are cross-sectional views showing a light emitting diode which can be applied to the present invention.

A light emitting diode in FIG. 18A has a structure in which a light emitting element 400 is covered with a cover 401 including a fluorescent material 402. The cover 401 has a reverse-tapered shape and a partition wall may be provided around the cover 401. Various emission colors can be obtained by a combination of emission colors from the fluorescent material and the light emitting element. In addition, various kinds of fluorescent materials may be used.

Figure 18B:
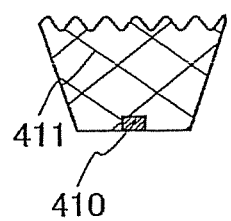

A light emitting diode in FIG. 18B has a structure in which a light emitting element 410 is covered with a cover 411 having a projection and a depression on its surface. Since the cover 411 has a projection and a depression on its surface, light emitted from the light emitting element 410 is diffused. A diffusing direction or a diffusing amount of light can be controlled with a shape of the projection and the depression.

Figure 18C:
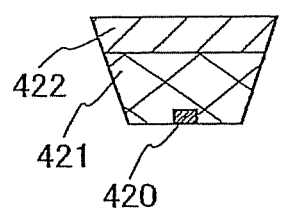

A light emitting diode shown in FIG. 18C has a structure in which a light emitting element 420 is covered with a stacked layer including covers 422 and 421. The cover 422 may be provided for diffusing light or may be provided as a protective film of the light emitting element. Thus, a stacked layer including a plurality of covers of the light emitting element may be provided.

Figure 18D:
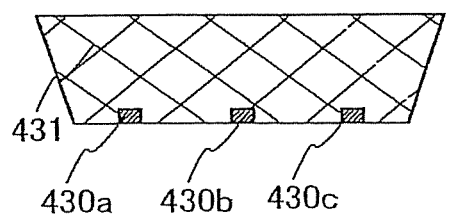

A light emitting diode shown in FIG. 18D has a structure in which light emitting elements 430a, 430b, and 430c are covered with a cover 431. A structure such that a plurality of light emitting elements are covered with one cover, may be employed. For example, a structure in which a light emitting element 430a which is a red light emitting diode, a light emitting element 430b which is a green light emitting diode, and a light emitting element 430c which is a blue light emitting diode may be covered with one cover may be employed. A cover portion of the light emitting diode may be provided so as to surround the light emitting element without being directly in contact, or the cover portion may be directly in contact with the light emitting element to form a resin or the like as a film. In addition, as shown in FIG. 18A, the covers 411, 421, 422, and 431 may include a fluorescent material or another diffusing substance.

Figure 7:
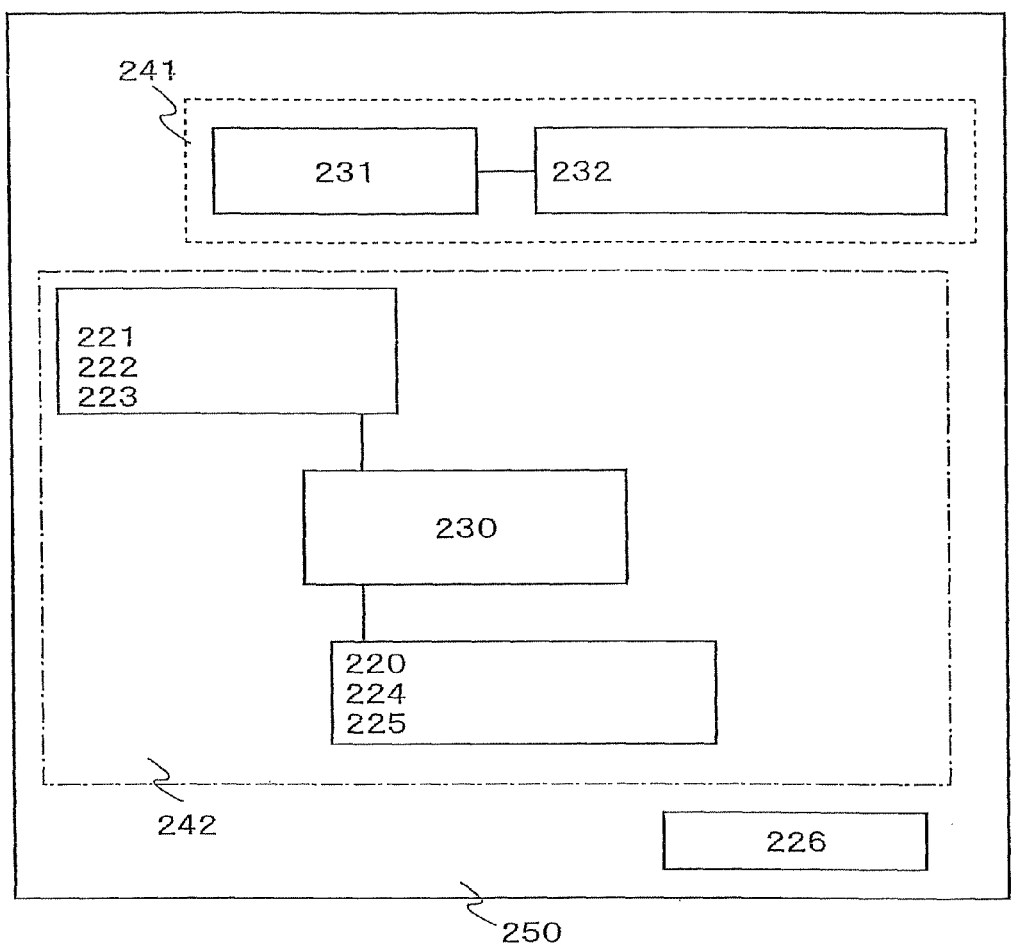
FIG. 7 is a block diagram showing a display device of the present invention.

An example of an operation mechanism of a display device in this embodiment mode is described with reference to a block diagram of FIG. 7. A liquid crystal display device 250 includes a liquid crystal display panel module 241 including the liquid crystal display panel 231 and the liquid crystal display panel driving circuit 232; a backlight module 242 including the backlight unit 230, the temperature sensor 221 in a backlight unit region, the temperature controller 222, the thermoelectric element driving circuit 223, the color sensor 220, the light emitting diode controlling device 224, and a light emitting diode driving circuit 225; and a thermoelectric module 226.

A light emitting diode in the backlight unit 230 emits light by the light emitting diode driving circuit 225. The color sensor 220 provided in the backlight unit monitors light emitting diodes which emit light of various specific colors (such as a red light emitting diode, a green light emitting diode, and a blue light emitting diode) to see if predetermined output from each light emitting diode is obtained. Feedback of information to the light emitting diode controlling device 224 is carried out and the information is outputted to the light emitting diode driving circuit 225.

In addition, a temperature of the backlight unit 230 is measured, by the temperature sensor 221 provided in the backlight region, so that a state of heat generation of the light emitting diode is monitored. When a temperature of the light emitting diode is out of (higher or lower than) a predetermined temperature range, the thermoelectric element is driven by the thermoelectric element driving circuit 223 to cool or heat the light emitting diode and the temperature is controlled by the temperature controller 222, in order to prevent the light emitting diode from driving at outside of (higher or lower than) the temperature range.

Further, the thermoelectric module 226 is provided in the liquid crystal display device so that temperature variation in the liquid crystal display device can be utilized for driving of another light emitting diode, a thermoelectric element, and the like. Since a thermoelectric element which can carry out cooling and heating efficiently is included in a chassis in the present invention, desired temperature variation is easily obtained in the liquid crystal display device. The thermoelectric module 226 may be provided in any place in the liquid crystal display device. The thermoelectric module 226 may be provided in a liquid crystal display panel module region or in a backlight module region, or across the both regions. Alternatively, the thermoelectric module 226 may be provided separately from the liquid crystal display device. A plurality of thermoelectric modules, color sensors, and temperature sensors may be provided. When a plurality of color sensors and temperature sensors are provided, monitoring can be carried out with further accuracy.

Figure 8:
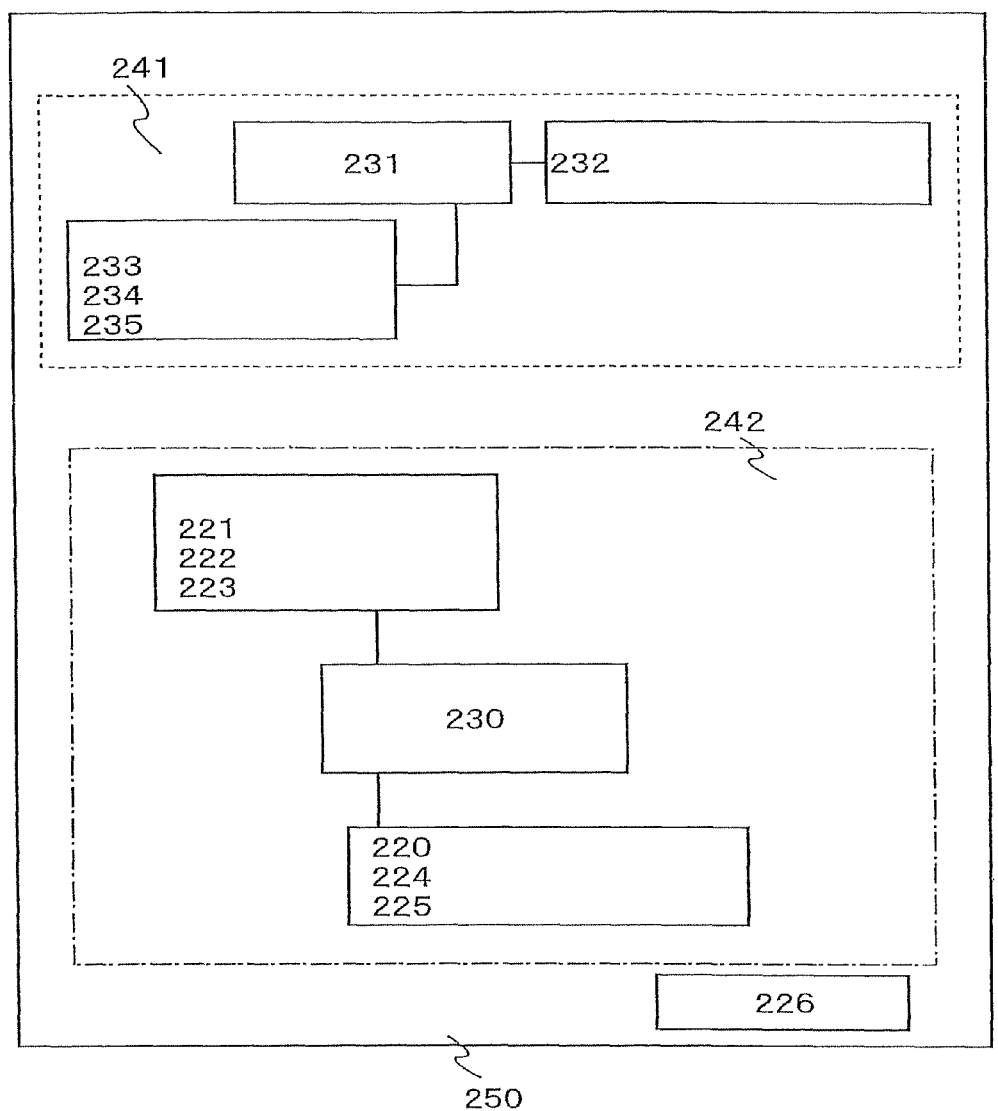
FIG. 8 is a block diagram showing a display device of the present invention.

In addition, as shown in FIG. 8, a thermoelectric element may also be provided in a liquid crystal display panel module 241. In this case, a temperature sensor 233, a temperature controller 234, and a thermoelectric element driving circuit 235 are provided in a liquid crystal display region. In addition, a temperature of the liquid crystal display panel 231 is monitored by the temperature sensor 233 provided in the liquid crystal display panel region. When a temperature of the liquid crystal display panel 231 is out of (higher or lower than) a predetermined temperature range, the thermoelectric element is driven by the thermoelectric element driving circuit 235 provided in the liquid crystal display panel 231 to cool or heat the liquid crystal display panel 231 and the temperature is controlled by the temperature controller 234 so that the temperature of the liquid crystal display panel 231 is in the predetermined temperature range.

In FIG. 8, a structure in which the thermoelectric element driving circuits 235 and 223 are separately provided in the backlight unit region and the liquid crystal display panel region, respectively. It is possible that the thermoelectric element driving circuits operate in conjunction with each other. Alternatively, it is possible that they operate differently at the same time such that the thermoelectric element driving circuit 235 operates to heat the thermoelectric element and the thermoelectric element driving circuit 233 operates to cool the thermoelectric element.

Figure 9:
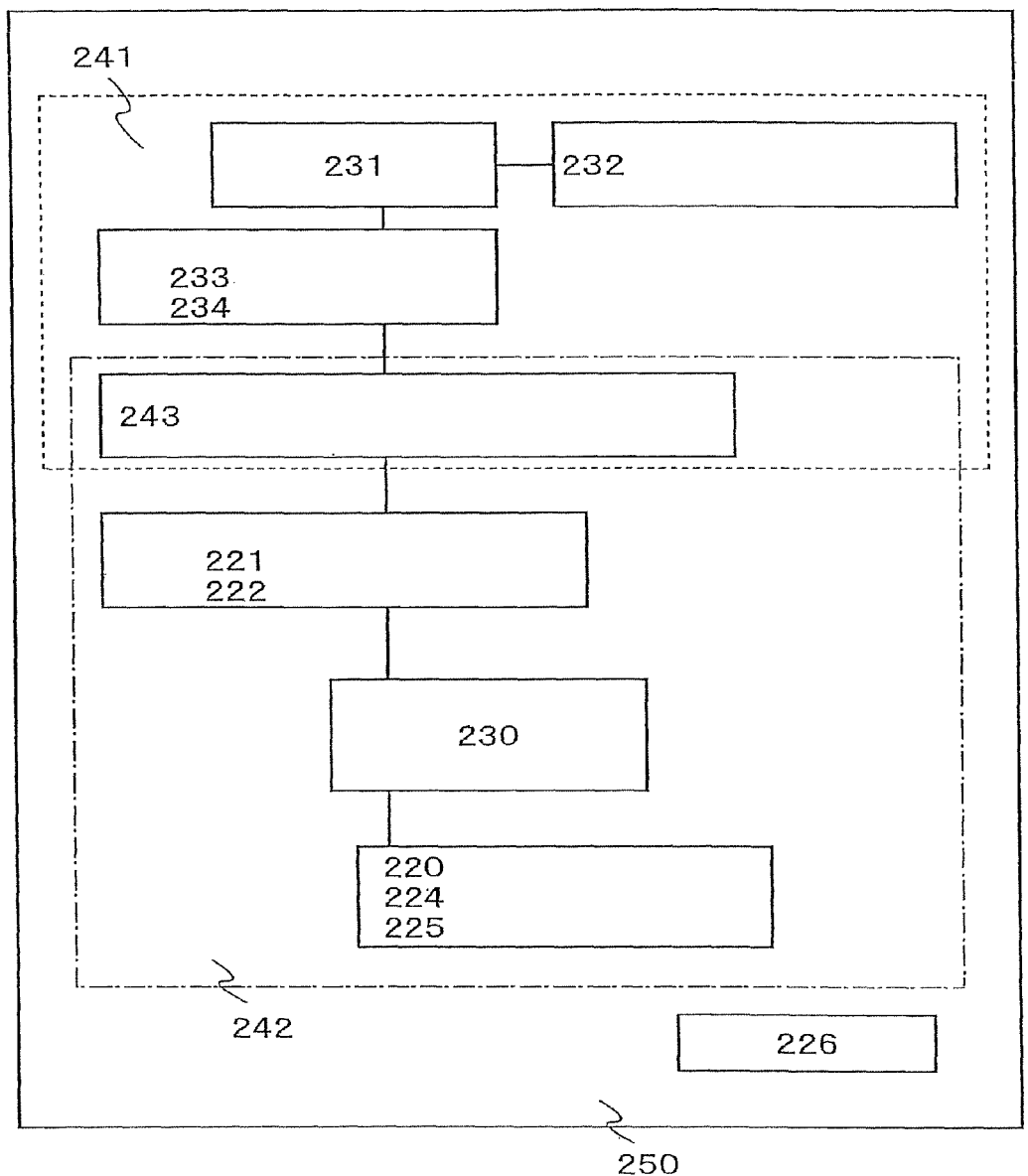
FIG. 9 is a block diagram showing a display device of the present invention.

FIG. 9 shows an example in which a thermoelectric element in the liquid crystal display panel module 241 and a thermoelectric element in the backlight module 242 are driven by one common thermoelectric element driving circuit 243. As shown in FIG. 9, when the thermoelectric element driving circuit is provided to be shared, there is an advantage such that the liquid crystal display device can be thinned and cost can be reduced.

With the present invention, heat generation of the light emitting diode used in a light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

Embodiment Mode 3

In this embodiment mode, a liquid crystal display device including a backlight device of the present invention and including a thin film transistor having a crystalline semiconductor film is described.

Figure 16A:
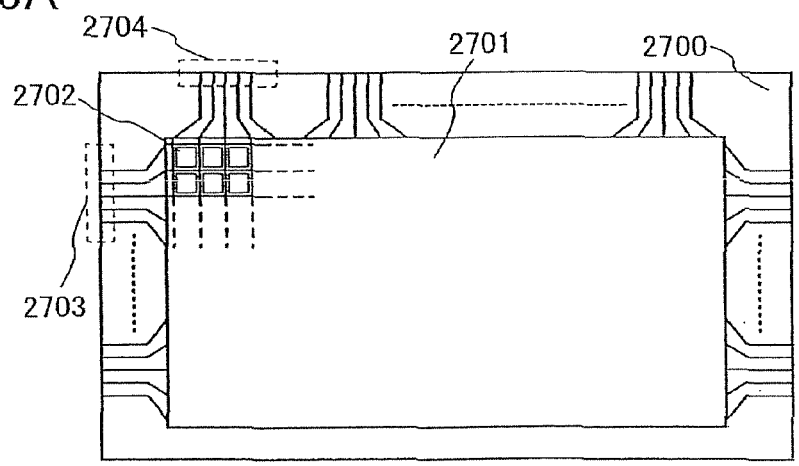
FIGS. 16A to 16C are top views showing a display device of the present invention.

FIG. 16A is a top view showing a structure of a display device of the present invention, in which a pixel portion 2701 including pixels 2702 arranged in matrix, a scanning line input terminal 2703, and a signal line input terminal 2704 are formed over a substrate 2700 with an insulating surface. The number of pixels provided may be determined in accordance with various standards. For example, the number of pixels of XGA for RGB full-color display may be 1024×768×3 (RGB), the number of pixels of UXGA for RGB full-color display may be 1600×1200×3 (ROB), and the number of pixels corresponding to a full-speck high vision for ROB full-color display may be 1920×1080×3 (RGB).

The pixels 2702 are arranged in matrix provided at intersections of scanning lines extended from the scanning line input terminal 2703 and signal lines extended from the signal line side input terminal 2704. Each pixel 2702 includes a switching element and a pixel electrode layer connected thereto. As a representative example of a switching element, a TFT can be given. A TFT has a gate electrode layer side connected to the scanning line and a source or drain side connected to the signal line, so that each pixel can be controlled independently by a signal inputted from an external portion.

Figure 17A:
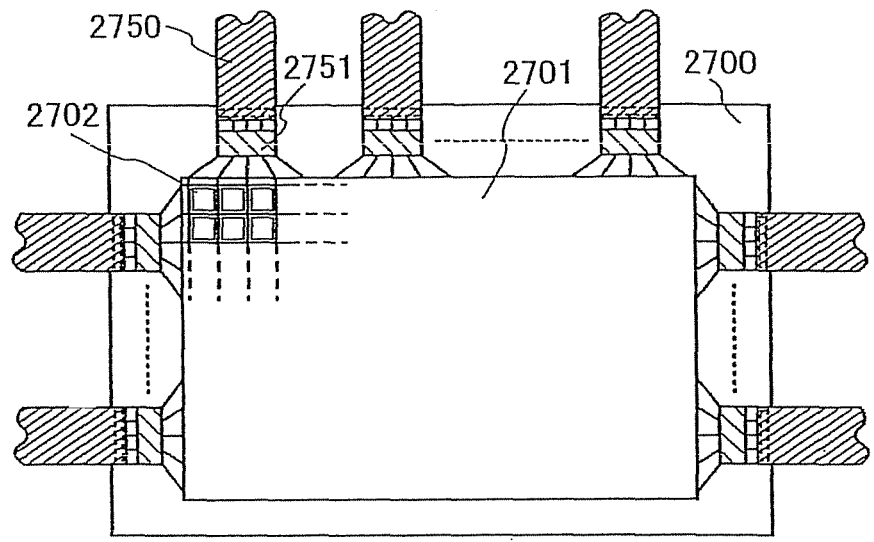
FIGS. 17A and 17B are top views showing a display device of the present invention.
Figure 17B:
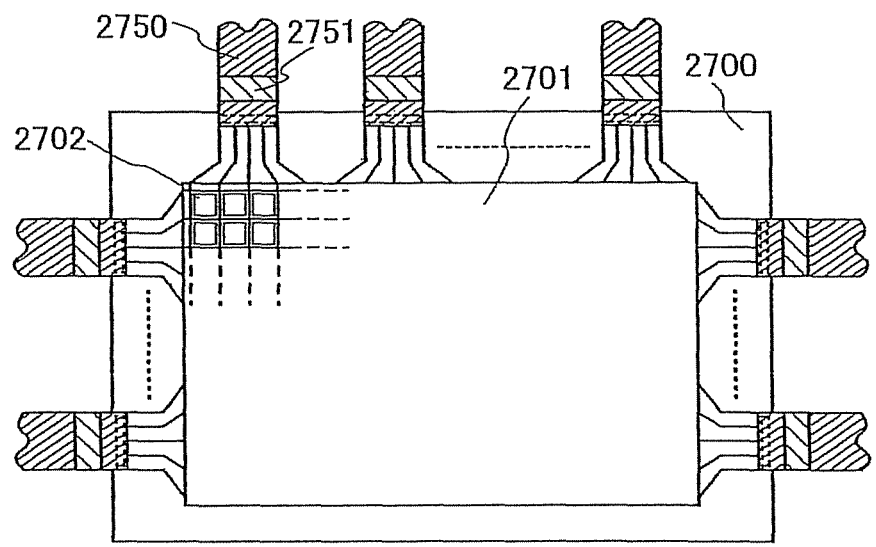

Although FIG. 16A shows a structure of a display panel in which a signal inputted to the scanning line and the signal line is controlled by an external driving circuit, a driver IC 2751 may be mounted over a substrate 2700 by a COG (Chip On Glass) method as shown in FIG. 17A. Alternatively, a TAB (Tape Automated Bonding) method shown in FIG. 17B may be employed. The driver IC may be one formed over a single crystalline semiconductor substrate or may be a circuit that is formed using a TFT over a glass substrate. In FIGS. 17A and 17B, the driver IC 2751 is connected to an FPC (Flexible Printed Circuit) 2750.

Figure 16B:
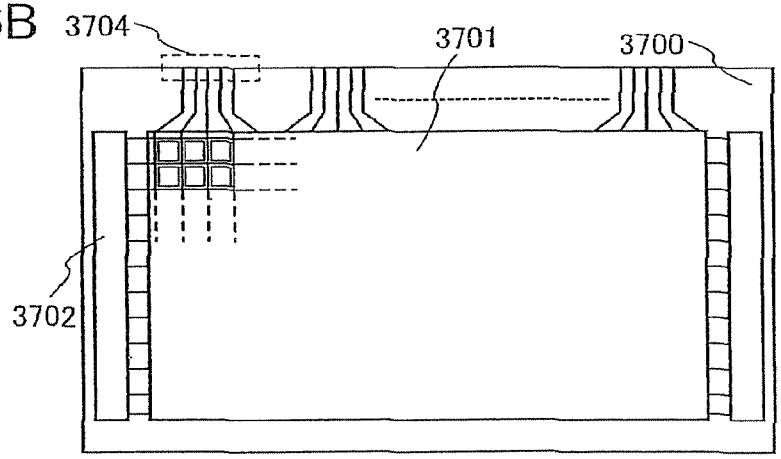
Figure 16C:
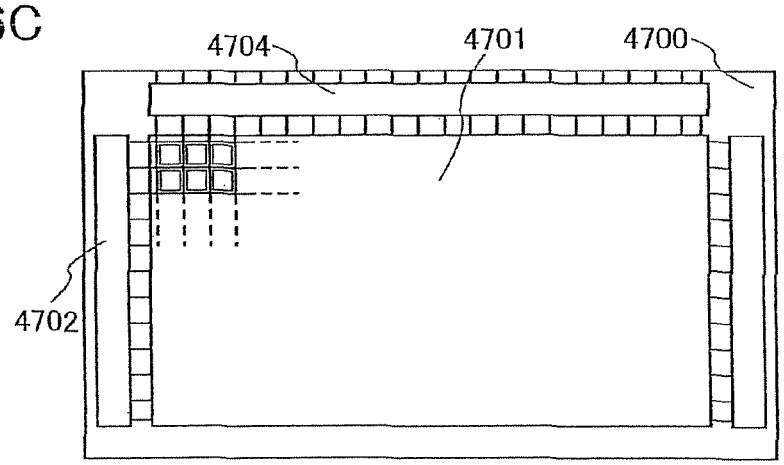

In a case of forming a TFT provided in a pixel with a semiconductor with crystallinity, a scanning line driving circuit 3702 can also be formed over a substrate 3700, as shown in FIG. 16B. In FIG. 16B, a pixel portion 3701 is controlled by an external driving circuit connected to a signal line input terminal 3704, similarly to FIG. 16A. In a case where a TFT provided in a pixel is formed of a polycrystalline (microcrystalline) semiconductor, a signal crystalline semiconductor, or the like with high mobility, a pixel portion 4701, a scanning line driving circuit 4702, and a signal line driving circuit 4704 can be fowled over a substrate 4700.

Figure 14:
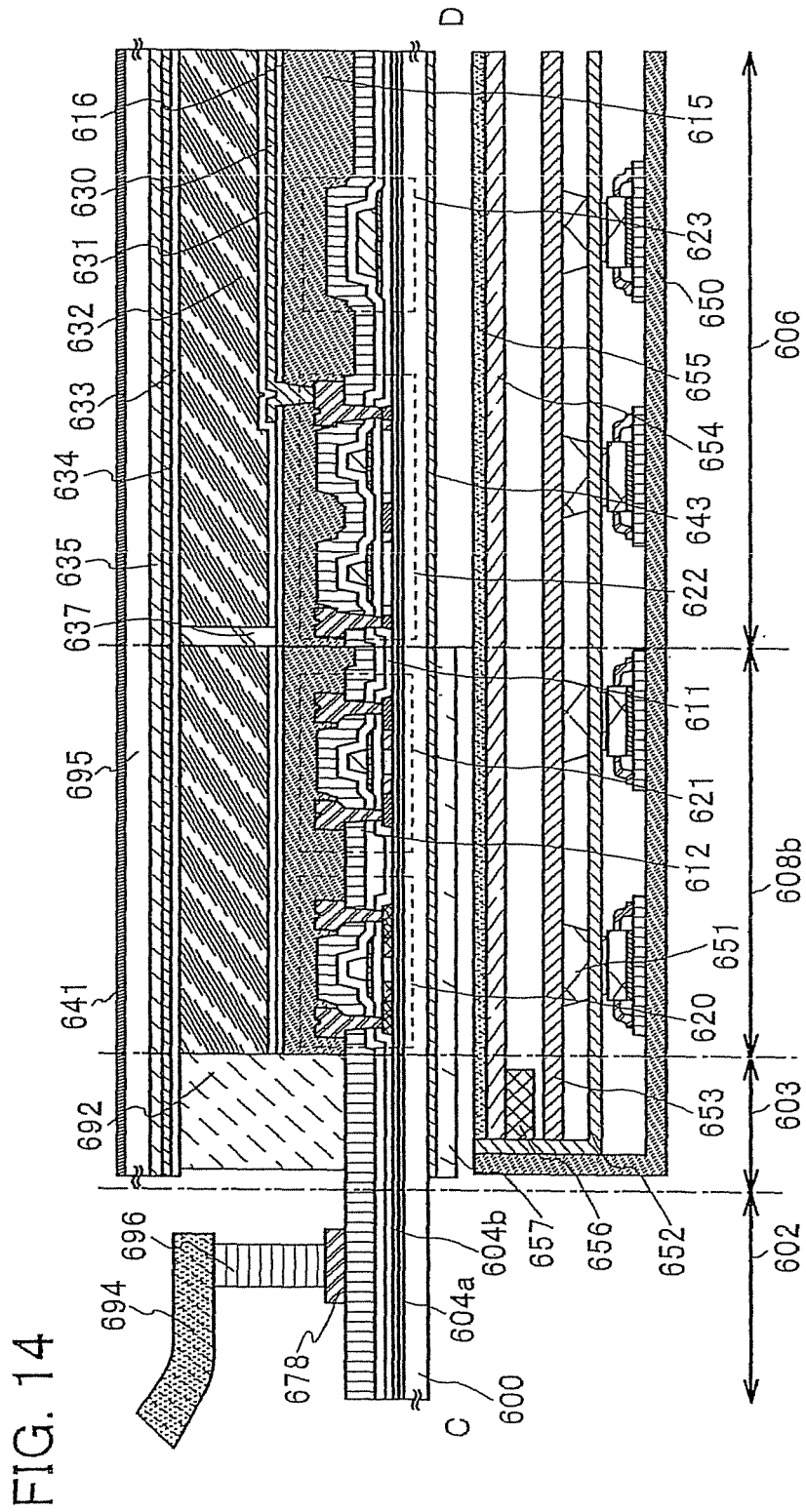
FIG. 14 is a cross-sectional view showing a display device of the present invention.
Figure 23:
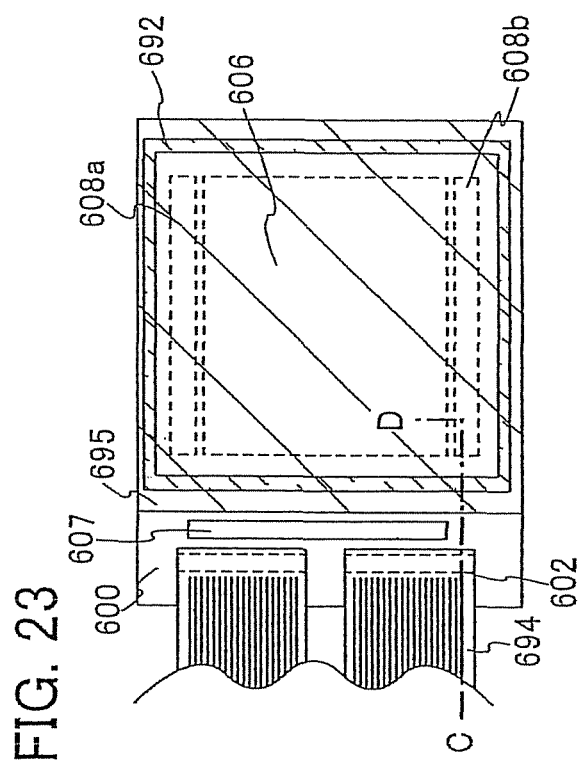
FIG. 23 is a top view of a display device of the present invention.

FIG. 23 shows a top view of a liquid crystal display device including a backlight unit of the present invention and FIG. 14 is a cross-sectional view taken along a line C-D in FIG. 23.

As shown in FIGS. 23 and 14, a pixel region 606, a driving circuit region 608a which is a scanning line driving circuit, and a driving circuit region 608b which is a scanning line driving region are sealed with a sealant 692 between a substrate 600 and a counter substrate 695. A driving circuit region 607 which is a signal line driving circuit formed with an IC driver is provided over the substrate 600. A transistor 622 and a capacitor 623 are provided in the pixel region 606. A driving circuit having transistors 620 and 621 is provided in the driving circuit region 608b.

The substrate 600 and the counter substrate 695 are insulating substrates with a light-transmitting property (hereinafter, also referred to as a light-transmitting substrate). The substrate particularly transmits light in a wavelength region of visible light. For example, a glass substrate such as a barium borosilicate glass or alumino borosilicate glass, or a quartz substrate can be used. Alternatively, a substrate formed from plastics represented by polyethylene terephthalate (PET), polyethylene naphthalate (PEN), polyethersulfone (PES), and polycarbonate (PC); or a substrate formed from a synthetic resin with flexibility such as acrylic can be employed. Further alternatively, a film (formed from polypropylene, polyester, vinyl, polyvinyl fluoride, or vinyl chloride), a base film (formed from polyester, polyamide, or an inorganic evaporated film), and the like may be used. Although there is a concern that a substrate fowled from a synthetic resin generally has a low heat-resistance temperature compared to another substrate, the substrate formed from a synthetic resin can be used when a manufacturing process is carried out with a substrate with high heat resistance and then the substrate formed from a synthetic resin displaces the substrate with high heat resistance.

In the pixel region 606, a transistor 622 which is to be a switching element is provided over the substrate. 600, with base films 604a and 604b therebetween. In this embodiment mode, a multi-gate thin film transistor (TFT) is used as the transistor 622, which includes a semiconductor layer having an impurity region serving as a source region and a drain region, a gate insulating layer, a gate electrode layer having a stacked-layer structure including two layers, a source electrode layer and a drain electrode layer. The source electrode layer or the drain electrode layer is in contact with and electrically connected to an impurity region in the semiconductor layer and a pixel electrode layer 630. The thin film transistor can be manufactured by various methods. For example, a crystalline semiconductor film is used as an active layer, a gate electrode is formed thereover with a gate insulating film therebetween, and an impurity element is added to the active layer with use of the gate electrode. In such a manner, when the gate electrode is used for adding the impurity element, a mask for adding the impurity element is not required. The gate electrode can have a single layer structure or a stacked-layer structure. The impurity region can be a high concentration impurity region or a low concentration impurity region with its concentration being controlled. A structure of a thin film transistor having a low impurity region is called an LDD (Light Doped Drain) structure. Alternatively, the low concentration impurity region may be overlapped with the gate electrode and a structure of such a thin film transistor is called a GOLD (Gate Overlapped LDD) structure. Polarity of the thin film transistor becomes an n-type when phosphorus (P) or the like is added to the impurity region. The polarity of the thin film transistor becomes a p-type when boron (B) or the like is added. After that, insulating films 611 and 612 covering the gate electrode and the like are formed. A dangling bond of the crystalline semiconductor film can be terminated by a hydrogen element mixed into the insulating film 611 (and the insulating 612).

In order to further improve planarity, insulating films 615 and 616 may be formed as interlayer insulating films. For the insulating films 651 and 616, an organic material, an inorganic material, or a stacked-layer structure thereof can be used. For example, a material selected from silicon oxide, silicon nitride, silicon oxynitride, silicon nitride oxide, aluminum nitride, aluminum oxynitride, aluminum nitride oxide containing more nitrogen than oxygen, aluminum oxide, diamond like carbon (DLC), polysilazane, nitrogen-containing carbon (CN), PSG (phosphosilicate glass), or BPSG (borophosphosilicate glass), alumina, and a substance containing another inorganic insulating material can be used. Alternatively, an organic insulating material 1 may be used. As the organic material, either a photosensitive or nonphotosensitive material can be used, and polyimide, acryl, polyamide, polyimide amid; resist, benzocyclobutene, a siloxane resin, or the like can be used. Note that a siloxane resin is a resin including a Si—O—Si bond. The skeletal structure of siloxane is formed by a bond of silicon (Si) and oxygen (O). As a substituent, an organic group including at least hydrogen (such as an alkyl group or an aromatic hydrocarbon) is used. As the substituent, a fluoro group may be used. Alternatively, an organic group containing at least hydrogen, and a fluoro group may be used as the substituent.

The pixel region and the driving circuit region can be formed over one substrate when the crystalline semiconductor film is used. In this case, a transistor in the pixel portion and a transistor in the driving circuit region 608*b* are fainted at the same time. The transistor used in the driving circuit region 608*b* is included in a CMOS circuit. A thin film transistor included in the CMOS circuit has a GOLD structure, but it may have an LDD structure like the transistor 622.

A structure of the thin film transistor in the pixel region is not limited to those referred to in this embodiment mode and the thin film transistor in the pixel region may have a single gate structure with one channel formation region, a double gate structure with two channel formation regions, or a triple gate structure with three channel formation regions. A thin film transistor in a peripheral driving circuit region may also have a single gate structure, a double gate structure, or a triple gate structure.

Note that a manufacturing method of a thin film transistor is not limited to those referred to in this embodiment mode. The thin film transistor may have a top gate structure (such as a staggered type), a bottom gate structure (such as an inversed staggered type), a dual gate structure in which two gate electrode layers are arranged at above or below a channel formation region, each with a gate insulating film interposed therebetween, or another structure.

Then, an insulating layer 631 referred to as an orientation film is formed by a printing method or a droplet discharge method, to cover the pixel electrode layer 630 and the insulating film 616. Note that the insulating layer 631 can be selectively formed by a screen printing method or an off-set printing method. Thereafter, a rubbing treatment is performed. This rubbing treatment is not necessarily performed when a liquid crystal mode is, for example, a VA mode. An insulating layer 633 serving as an orientation film is similar to the insulating layer 633. Subsequently, the sealant 692 is formed in a region surrounding the pixels by a droplet discharge method.

After that, the counter substrate 695 provided with the insulating layer 633 serving as the orientation film, a conductive layer 634 serving as a counter electrode, and a color layer 635 serving as a color filter is attached to the substrate 600 which is a TFT substrate, with a spacer 637 therebetween. A liquid crystal layer 632 is provided in a space therebetween. Then, a polarizing plate 641 is provided on an outer side of the counter substrate 695 and a polarizing plate 643 is provided on a side of the substrate 600 which is opposite to a side where an element is formed. The polarizing plate can be provided on the substrate with use of an adhesive layer. In addition, a retardation plate may be provided between the polarizing plate and the substrate. A filler may be mixed into the sealant, and a shielding film (black matrix) or the like may be formed on the counter substrate 695. Note that a color filter or the like may be formed of materials which exhibit red (R), green (G), and blue (B) when the liquid crystal display device is a full-color display; and the color layer may be omitted or may be formed of a material which exhibits at least one color, when the liquid crystal display device is a single-color display.

Note that when RGB light emitting diodes (LEDs) or the like are located in the backlight device and a field sequential method which conducts color display by time division is employed, there is a case where a color filter is not provided. The black matrix may be provided so as to overlap with the transistor and the CMOS circuit since the black matrix reduces the reflection of outside light by the wiring in the transistor and the CMOS circuit. Alternatively, the black matrix may be provided to overlap with the capacitor. It is because the black matrix can prevent reflection due to a metal film included in the capacitor.

As a method for forming the liquid crystal layer, a dispenser method (dripping method) or an injection method in which the substrate 600 provided with an element and the counter substrate 695 are attached and liquid crystal is injected with use of capillary phenomenon can be used. A dripping method may be employed when a large substrate to which an injection method is difficult to be applied is used.

A spacer may be provided by a method in which particles each having a size of several micrometers are sprayed. In this embodiment mode, a method in which a resin film is formed over the entire surface of the substrate and then etched is employed. A material for the spacer is applied by a spinner and then, light exposure and a developing treatment are carried out so as to form a predetermined pattern. Further, the pattern is heated at 150 to 200° C. in a clean oven or the like to be hardened. The spacer manufactured in such a manner can have various shapes depending on the conditions of light exposure and the developing treatment. It is preferable that the spacer have a columnar shape with a flat top so that mechanical strength of the liquid crystal display device can be secured when the counter substrate is attached. The shape of the spacer is not particularly limited and may be conic, pyramidal, or the like.

Then, an FPC 694, which is a wiring board for connection is provided over a terminal electrode layer 678 electrically connected to the pixel region, with an anisotropic conductive layer 696 therebetween. The FPC 694 transmits a signal and potential from an external portion. Through the foregoing steps, a liquid crystal display device having a display function can be manufactured.

For the wiring in the transistor, the gate electrode layer, the pixel electrode layer 630, and the conductive layer 634 serving as the counter electrode can be formed with use of indium tin oxide (ITO), indium zinc oxide (IZO) in which zinc oxide (ZnO) is mixed with indium oxide, a conductive material in which silicon oxide ($SiO_2$) is mixed with indium oxide, organic indium, organic tin, indium oxide containing tungsten oxide, indium zinc oxide containing tungsten oxide, indium oxide containing titanium oxide, indium tin oxide containing titanium oxide, or the like. Alternatively, a material selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy of such metals; or metal nitride thereof can be used.

The backlight unit provided in the display device shown in FIG. 14 includes a light emitting diode 651, a chassis 650 having a thermoelectric element, a reflective sheet 652, a light guide plate 653, a diffusing plate 654, a prism sheet 655, and a color sensor 656.

In this embodiment mode, a light emitting diode is used as a light source of a backlight device and thermoelectric elements are provided in a chassis for holding the light emitting diode so that the thermoelectric elements surround the light emitting diode (under the light emitting diode and on the four sides thereof). A temperature in the backlight device is adjusted by cooling and heating by the thermoelectric elements. A thermoelectric element refers to an element of metal or semiconductor which converts heat energy to and from electric energy with use of a phenomenon relating heat and electricity. As an example of a thermoelectric element which can be used in the present invention, a Peltier element can be given.

When light is emitted from the light emitting diode, the temperature in the backlight device changes. A temperature sensor is provided in the backlight device to monitor a temperature condition, the thermoelectric element carries out cooling or heating by a driving circuit for driving the thermoelectric element, and the temperature is controlled with a temperature controller in the following manner. Further, a color sensor for monitoring output of the light emitting diode is provided, and the output of the light emitting diode is controlled by a light emitting diode controlling device for controlling the output of the light emitting diode. The light emitting diode is driven by a light emitting diode driving circuit.

A transmissive liquid crystal display panel module, which is provided in front of the backlight device, may also include a thermoelectric element for heating and cooling the liquid crystal display panel, a driving circuit for driving the thermoelectric element, a temperature sensor for monitoring a temperature condition of the (color) liquid crystal display panel, and a temperature controller for controlling the temperature.

A temperature sensor and a temperature controller may be provided for each of the thermoelectric element provided in the backlight device and the thermoelectric element provided in the liquid crystal display panel module so that the thermoelectric elements can be independently operated. Alternatively, the temperature sensor and the temperature controller may be provided to be shared so that the thermoelectric elements are operated together.

The backlight device and the liquid crystal display panel module may be located to be in contact with each other or to have a gap therebetween. In a case where the liquid crystal display panel module and the backlight device are provided to be in contact with each other and the thermoelectric element provided in the backlight device is in contact with the liquid crystal display panel module, a temperature of the liquid crystal display panel module can be also controlled by cooling and heating by the thermoelectric element.

In addition, a thermoelectric module may be provided in the liquid crystal display device to utilize temperature variation in the liquid crystal display device for driving another light emitting diode, a thermoelectric element, and the like. Since a thermoelectric element which can carry out cooling and heating efficiently is included in the chassis in the present invention, desired temperature variation is easily obtained in the liquid crystal display device.

With the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

This embodiment mode can be freely combined with the foregoing embodiment modes.

Embodiment Mode 4

In this embodiment mode, a liquid crystal display device including a backlight device of the present invention and using a thin film transistor which has an amorphous semiconductor film is described.

Figure 15:
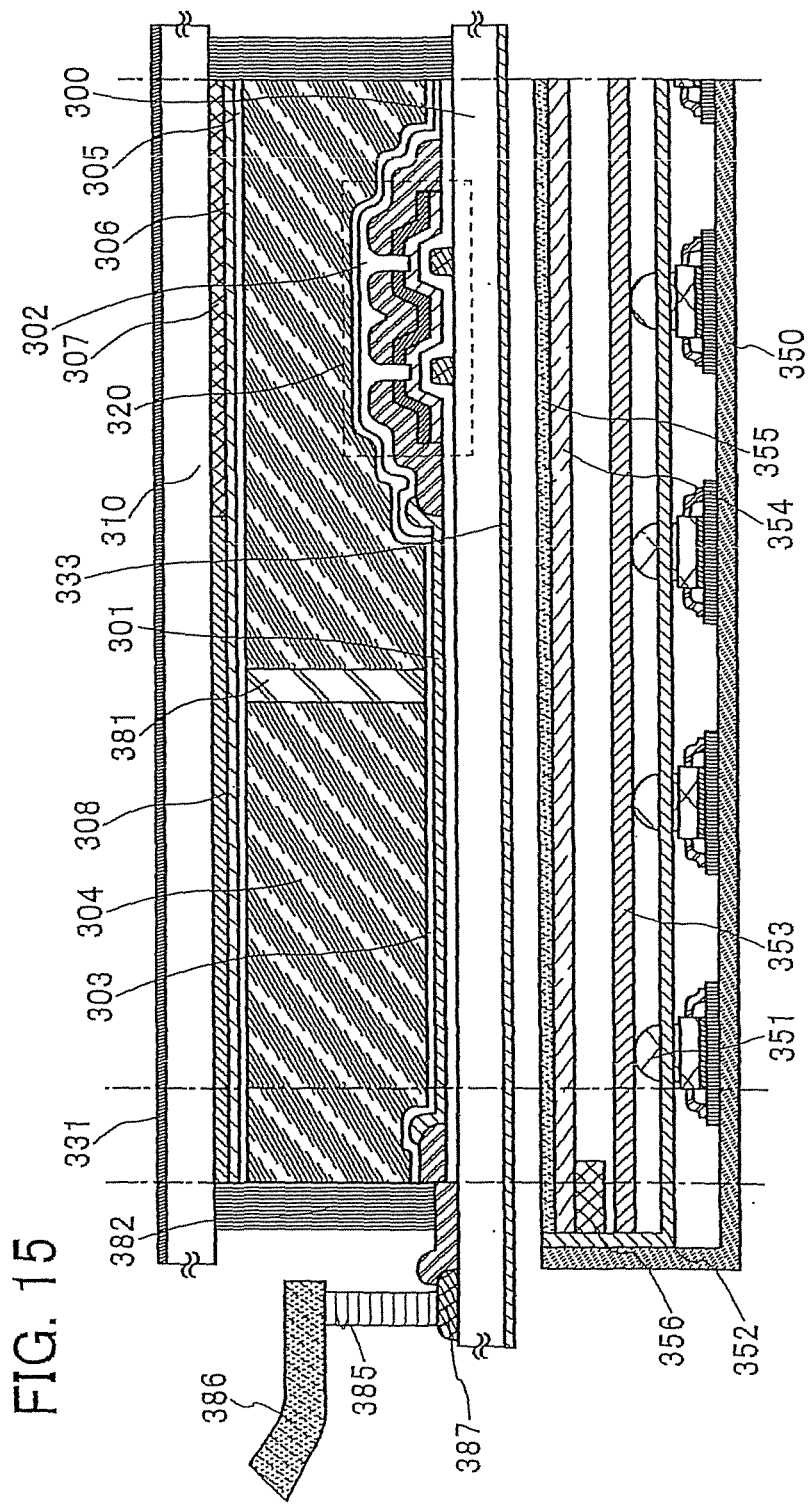
FIG. 15 is a cross-sectional view showing a display device of the present invention.

The display device shown in FIG. 15 includes a transistor 320 which is an inversed staggered thin film transistor, a pixel electrode layer 301, an insulating layer 302, an insulating layer 303, a liquid crystal layer 304, a spacer 381, an insulating layer 305, a counter electrode layer 306, a color filter 308, a black matrix 307, a counter substrate 310, a polarizing plate 331, and a polarizing plate 333 in a pixel region; a sealant 382, a terminal electrode layer 387, an anisotropic conductive layer 385, and an FPC 386 in a sealing region; over a substrate 300.

The transistor 320 which is an inversed staggered thin film transistor formed in this embodiment mode has a gate electrode layer, a source electrode layer, and a drain electrode layer formed by a droplet discharge method. The droplet discharge method is a method in which a conductive layer and an electrode layer are formed by discharging a composition containing a liquid conductive material and solidifying the composition, by drying and baking. If a composition containing an insulating material is discharged and solidified through drying and baking, an insulating layer can also be formed. When a droplet discharge method is employed, a constituent of a display device, such as a conductive layer and an insulating layer can be selectively formed, which can simplify the process and reduce a waste of materials; therefore, a display device can be manufactured at low cost and with high productivity.

In this embodiment mode, an amorphous semiconductor is used as a semiconductor layer, and a semiconductor layer having one conductivity may be formed if needed. In this embodiment mode, a semiconductor layer and an n-type amorphous semiconductor layer which is the semiconductor layer having one conductivity are stacked. in addition, an n-channel thin film transistor with an NMOS structure which includes an n-type semiconductor layer, a p-channel thin film transistor with a PMOS structure which includes a p-type semiconductor layer, or a CMOS structure which includes an n-channel thin film transistor and a p-channel thin film transistor can be manufactured.

In addition, an n-channel thin film transistor and a p-channel thin film transistor can be formed by adding an element imparting conductivity by doping and forming an impurity region in a semiconductor layer. Further, instead of formation of the n-type semiconductor layer, a plasma treatment may be performed with a $PH_3$ gas to impart conductivity to the semiconductor layer.

In this embodiment mode, the transistor 320 is an n-channel inversed staggered thin film transistor. Alternatively, an inversed staggered thin film transistor of a channel protective type in which a protective layer is provided over a channel region in the semiconductor layer may be used.

The semiconductor layer can be formed with use of an organic semiconductor material as a semiconductor, by a vapor deposition method, a printing method, a spray method, a spin coating method, a droplet discharge method, a dispenser method, or the like. In this case, since an etching step is not always necessary, the number of steps can be reduced. As an organic semiconductor, a low molecular material such as pentacene or a high molecular material can be used, or a material such as an organic pigment or a conductive high molecular organic material can be used. As an organic semiconductor material used in the present invention, a π-conjugated high molecular material with its skeleton including a conjugate double bond is desirable. Typically, a high molecular material which is soluble in a liquid such as polythiophene, polyfluorene, poly(3-alkylthiophene), or a polythiophene derivative can be used.

A backlight unit included in the display device shown in FIG. 15 includes a light emitting diode 351, a chassis 350 having a thermoelectric element, a reflective sheet 352, a light guide plate 353, a diffusing plate 354, a prism sheet 355, and a color sensor 356.

In this embodiment mode, a light emitting diode is used as a light source of a backlight device and thermoelectric elements are provided in a chassis for holding the light emitting diode so that the thermoelectric elements surround the light emitting diode (under the light emitting diode and on the four sides thereof). A temperature in the backlight device is adjusted by cooling and heating by the thermoelectric elements. A thermoelectric element refers to an element of metal or semiconductor which converts heat energy to and from electric energy with use of a phenomenon relating heat and electricity. As an example of a thermoelectric element which can be used in the present invention, a Peltier element can be given.

When light is emitted from the light emitting diode, the temperature in the backlight device changes. A temperature sensor is provided in the backlight device to monitor a temperature condition, the thermoelectric element carries out cooling or heating by being controlled by a driving circuit for driving the thermoelectric element, and the temperature is controlled with a temperature controller. Further, a color sensor for monitoring output of the light emitting diode is provided, and the output of the light emitting diode is controlled by a light emitting diode controlling device for controlling the output of the light emitting diode. The light emitting diode is driven by a light emitting diode driving circuit.

A transmissive liquid crystal display panel module, which is provided in front of the backlight device, may also include a thermoelectric element for heating and cooling the liquid crystal display panel, a driving circuit for driving the thermoelectric element, a temperature sensor for monitoring a temperature condition of the (color) liquid crystal display panel, and a temperature controller for controlling the temperature.

A temperature sensor and a temperature controller may be provided for each of the thermoelectric element provided in the backlight device and the thermoelectric element provided in the liquid crystal display panel module so that the thermoelectric elements can be independently operated. Alternatively, the temperature sensor and the temperature controller may be provided to be shared so that the thermoelectric elements are operated at the same time.

The backlight device and the liquid crystal display panel module may be located to be in contact with each other or to have a gap therebetween. In a case where the liquid crystal display panel module and the backlight device are provided to be in contact with each other and the thermoelectric element provided in the backlight device is in contact with the liquid crystal display panel module, a temperature of the liquid crystal display panel module can be also controlled by cooling and heating by the thermoelectric element.

In addition, a thermoelectric module may be provided in the liquid crystal display device to utilize temperature variation in the liquid crystal display device for driving another light emitting diode, a thermoelectric element, and the like. Since a thermoelectric element which can carry out cooling and heating efficiently is included in the chassis in the present invention, desired temperature variation is easily obtained in the liquid crystal display device.

With the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

This embodiment mode can be freely combined with the foregoing embodiment modes.

Embodiment Mode 5

In this embodiment mode, another structural example of a backlight device of the present invention and of a display device including the backlight device are described.

Figure 25A:
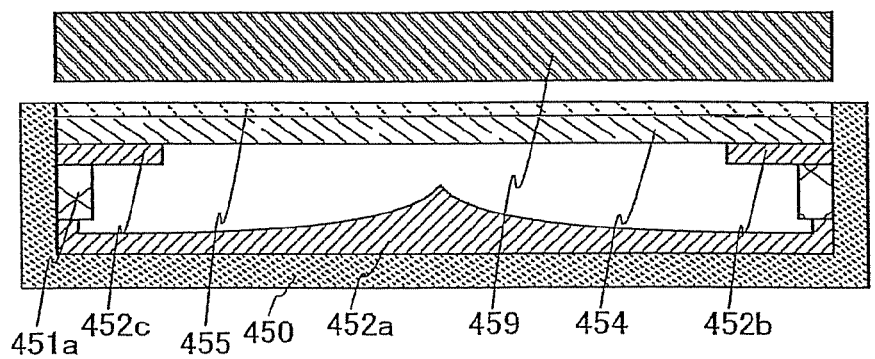
FIGS. 25A to 25C are cross-sectional views showing a display device of the present invention.
Figure 25B:
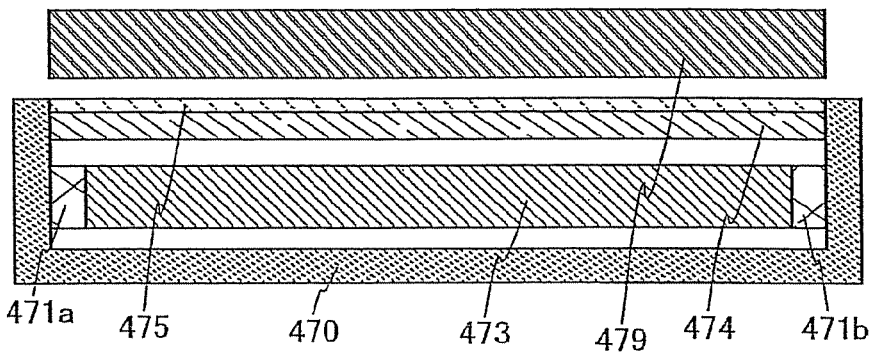

A backlight device of the present invention may be a sidelight type (also referred to as an edgelight type) as shown in FIGS. 25A and 25B.

A display device shown in FIG. 25A includes a liquid crystal display panel module 459, a chassis 450 having a thermoelectric element, light emitting diodes 451a and 451b, reflective sheets 452a, 452b, and 452c, a diffusing plate 454, and a prism sheet 455. The light emitting diode 451a and 451b are provided on lateral portions of the chassis 450 having a thermoelectric element. The reflective sheets 452a, 452b, and 452c reflect light emitted from the light emitting diodes 451a and 451b to the liquid crystal display panel module side. The reflective sheet 452a has a projection in the center so that the light is reflected to be propagated in the backlight device efficiently.

A display device shown in FIG. 25B includes a liquid crystal display panel module 479, a chassis 470 having a thermoelectric element, light emitting diodes 471a and 471b, a light guide plate 473, a diffusing plate 474, and a prism sheet 475. The light emitting diodes 471a and 471b are provided on lateral portions of the chassis 470 having a thermoelectric element. The light guide plate 473 propagates light emitted from the Light emitting diodes 471a and 471b in the backlight device so that the light is emitted to the liquid crystal display panel module side.

Figure 25C:
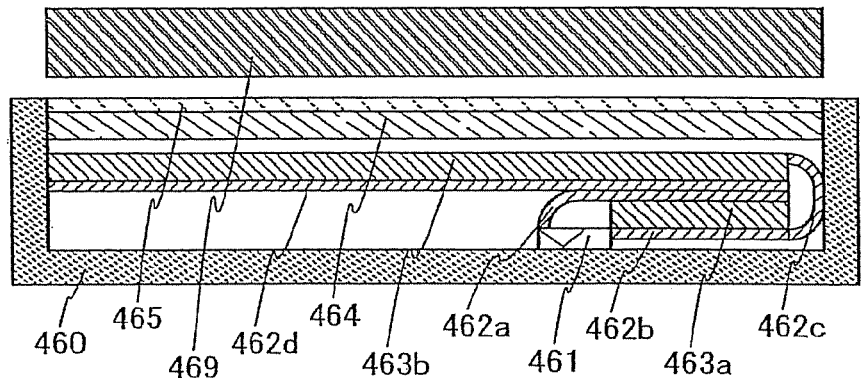

A display device shown in FIG. 25C includes a liquid crystal display panel module 469, a chassis 460 having a thermoelectric element, a light emitting diode 461, reflective sheets 462a, 462b, 462c, and 462d, light guide plates 463a and 463b, a diffusing plate 464, and a prism sheet 465. The light emitting diode 461 is provided on the bottom portion of the chassis 460 having a thermoelectric element. The reflective sheets 462a and 462b reflect light emitted from the light emitting diode 461 and propagate the light to the light guide plate 463a. The light propagated by the light guide plate 463a is reflected by the reflective sheet 462c, propagated by the light guide plate 463b, and then, emitted to the liquid crystal display panel module side by the reflective sheet 462d.

As a plurality of light emitting diodes used in the present invention, light emitting diodes which emit light of different colors can be used. For example, a red light emitting diode, a green light emitting diode, and a blue light emitting diode can be included. In specific, a plurality of light emitting diodes can include a first light emitting diode having a peak in wavelength of an emission color at 625 nm±10 nm, a second light emitting diode having a peak in wavelength of an emission color at 530 nm±15 nm, and a third light emitting diode having a peak in wavelength of an emission color at 455 nm±10 nm.

In this embodiment mode, a light emitting diode is used as a light source of a backlight device and thermoelectric elements are provided in a chassis for holding the light emitting diode so that the thermoelectric elements surround the light emitting diode (under the light emitting diode and on the four sides thereof). A temperature in the backlight device is adjusted by cooling and heating by the thermoelectric elements. A thermoelectric element refers to an element of metal or semiconductor which converts heat energy to and from electric energy with use of a phenomenon relating heat and electricity. As an example of a thermoelectric element which can be used in the present invention, a Peltier element can be given.

When light is emitted from the light emitting diode, the temperature in the backlight device changes. A temperature sensor is provided in the backlight device to monitor a temperature condition, the thermoelectric element carries out cooling or heating by being controlled by a driving circuit for driving the thermoelectric element, and the temperature is controlled with a temperature controller. Further, a color sensor for monitoring output of the light emitting diode is provided, and the output of the light emitting diode is controlled by a light emitting diode controlling device for controlling the output of the light emitting diode. The light emitting diode is driven by a light emitting diode driving circuit.

A transmissive liquid crystal display panel module, which is provided in front of the backlight device, may also include a thermoelectric element for heating and cooling the liquid crystal display panel, a driving circuit for driving the thermoelectric element, a temperature sensor for monitoring a temperature condition of the (color) liquid crystal display panel, and a temperature controller for controlling the temperature.

A temperature sensor and a temperature controller may be provided for each of the thermoelectric elements provided in the backlight device and the thermoelectric element provided in the liquid crystal display panel module so that the thermoelectric elements can be independently operated. Alternatively, the temperature sensor and the temperature controller may be provided to be shared so that the thermoelectric elements are operated together.

The backlight device and the liquid crystal display panel module may be located to be in contact with each other or to have a gap therebetween. In a case where the liquid crystal display panel module and the backlight device are provided to be in contact with each other and the thermoelectric element provided in the backlight device is in contact with the liquid crystal display panel module, a temperature of the liquid crystal display panel module can be also controlled by cooling and heating by the thermoelectric element.

In addition, a thermoelectric module may be provided in the liquid crystal display device to utilize temperature variation in the liquid crystal display device for driving another light emitting diode, a thermoelectric element, and the like. Since a thermoelectric element which can carry out cooling and heating efficiently is included in the chassis in the present invention, desired temperature variation is easily obtained in the liquid crystal display device.

With the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel. can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

This embodiment mode can be freely combined with the foregoing embodiment modes.

Embodiment Mode 6

In this embodiment mode, operation of each circuit or the like included in a display device is described.

Figure 19A:
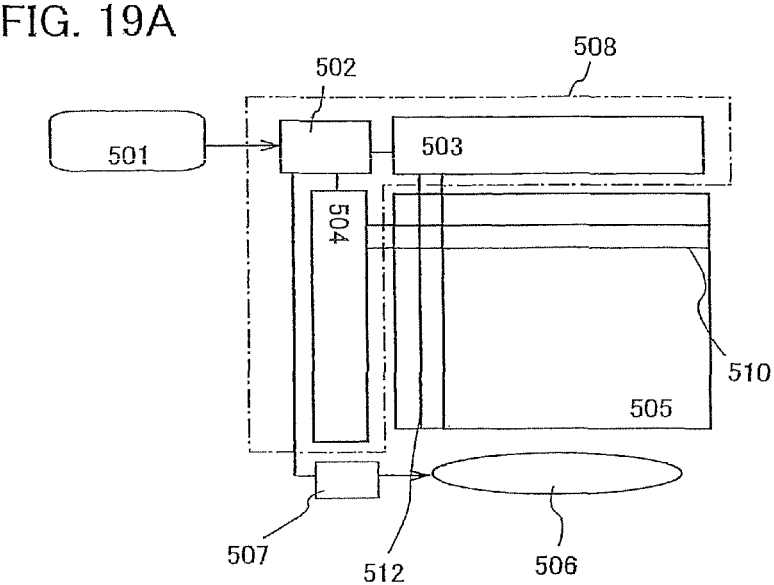
FIGS. 19A to 19C are block diagrams showing a display device of the present invention.
Figure 19B:
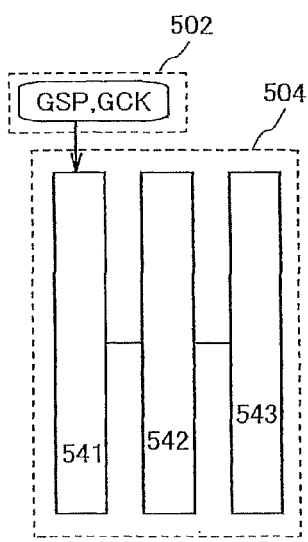
Figure 19C:
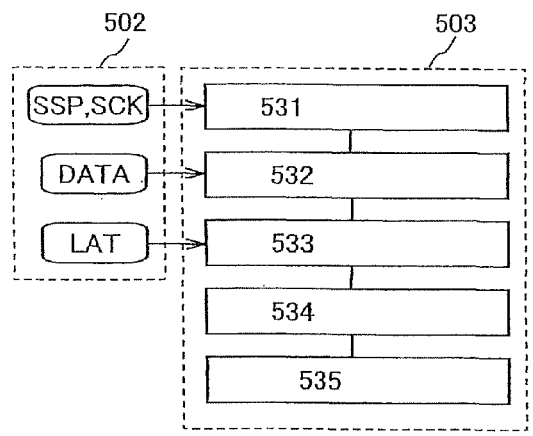

FIGS. 19A to 19C show system block diagrams of a pixel portion 505 and a driving circuit portion 508 in a display device.

In the pixel portion 505, a plurality of pixels are included. Switching elements are provided in each intersection region of signal lines 512 and scanning lines 510, which serves as a pixel. Application of voltage for controlling tilt of liquid crystal molecules can be controlled by the switching elements. Such a structure in which switching elements are provided in each intersection region is called an active type. A pixel portion of the present invention is not limited to such an active type, and may have a passive type structure instead. The passive type is manufactured by a simple process because a switching element is not included in each pixel.

The driving circuit portion 508 includes a controlling circuit 502, a signal line driving circuit 503, and a scanning line driving circuit 504. The controlling circuit 502 to which an image signal 501 is inputted has a function to control a gray scale in accordance with contents to be displayed of the pixel portion 505. The controlling circuit 502 inputs a generated signal to the signal line driving circuit 503 and the scanning line driving circuit 504. When a switching element is selected by the scanning line driving circuit 504 with the scanning line 510, voltage is applied to a pixel electrode in a selected intersection region. A value of this voltage is determined based on a signal inputted from the driving circuit 503 through the signal line.

Further, in the controlling circuit 502, a signal for controlling electric power supplied to a lighting unit 506 is generated. The signal is inputted to a power supply 507 of the lighting unit 506. As the lighting unit, the backlight unit shown in the foregoing embodiment modes can be used. Note that the lighting unit may be a frontlight instead of the backlight device. A frontlight is a platy light unit which includes a light emitter which illuminates the whole liquid crystal display panel module and a light guide body, and which is attached to a front surface side of the pixel portion. With such a lighting unit, the pixel portion can be evenly irradiated with light, with low power consumption.

As shown in FIG. 19B, a scanning line driving circuit 504 includes circuits serving as a shift resister 541, a level shifter 542, and a buffer 543. Signals such as a gate start pulse (GSP) and a gate clock signal (GCK) are inputted to the shift resister 541. Note that a structure of the scanning line driving circuit of the present invention is not limited to the structure shown in FIG. 19B.

As shown in FIG. 19C, the signal line driving circuit 503 includes circuits serving as a shift resister 531, a first latch 532, a second latch 533, a level shifter 534, and a buffer 535. The circuit serving as the buffer 535 is a circuit having a function for amplifying a weak signal and includes an operational amplifier and the like. A signal such as a start pulse (SSP) and data (DATA) such as a video signal are inputted to the level shifter 534 and the first latch 532, respectively. Latch (LAT) signals can be temporarily held in the second latch 533, and they are inputted to the pixel portion 505 at a time. Such operation is referred to as line sequential driving. If the pixel performs dot sequential driving instead of the line sequential driving, the second latch is not required. Thus, a structure of a signal driving circuit of the present invention is not limited to the structure shown in FIG. 19C.

The signal line driving circuit 503, the scanning line driving circuit 504, and the pixel portion 505 as described above can be formed of semiconductor elements provided over one substrate. The semiconductor element can be formed with use of a thin film transistor formed over a glass substrate. In this case, a crystalline semiconductor film may be applied to the semiconductor elements (refer to Embodiment Mode 5). A crystalline semiconductor film can be included in a circuit in a driving circuit portion since its characteristics, in particular mobility, is high. Further, the signal line driving circuit 503 and the scanning line driving circuit 504 can be mounted over the substrate with use of an IC (Integrated Circuit) chip. In this case, an amorphous semiconductor film can be applied to a semiconductor element in the pixel portion (refer to Embodiment Mode 5).

In such a display device, a light emitting diode is used as a light source of the backlight device and thermoelectric elements are provided in a chassis for holding the light emitting diode so that the thermoelectric elements surround the light emitting diode (under the light emitting diode and on the four sides thereof). A temperature in the backlight device is adjusted by cooling and heating by the thermoelectric elements. With the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

Embodiment Mode 7

Figure 20:
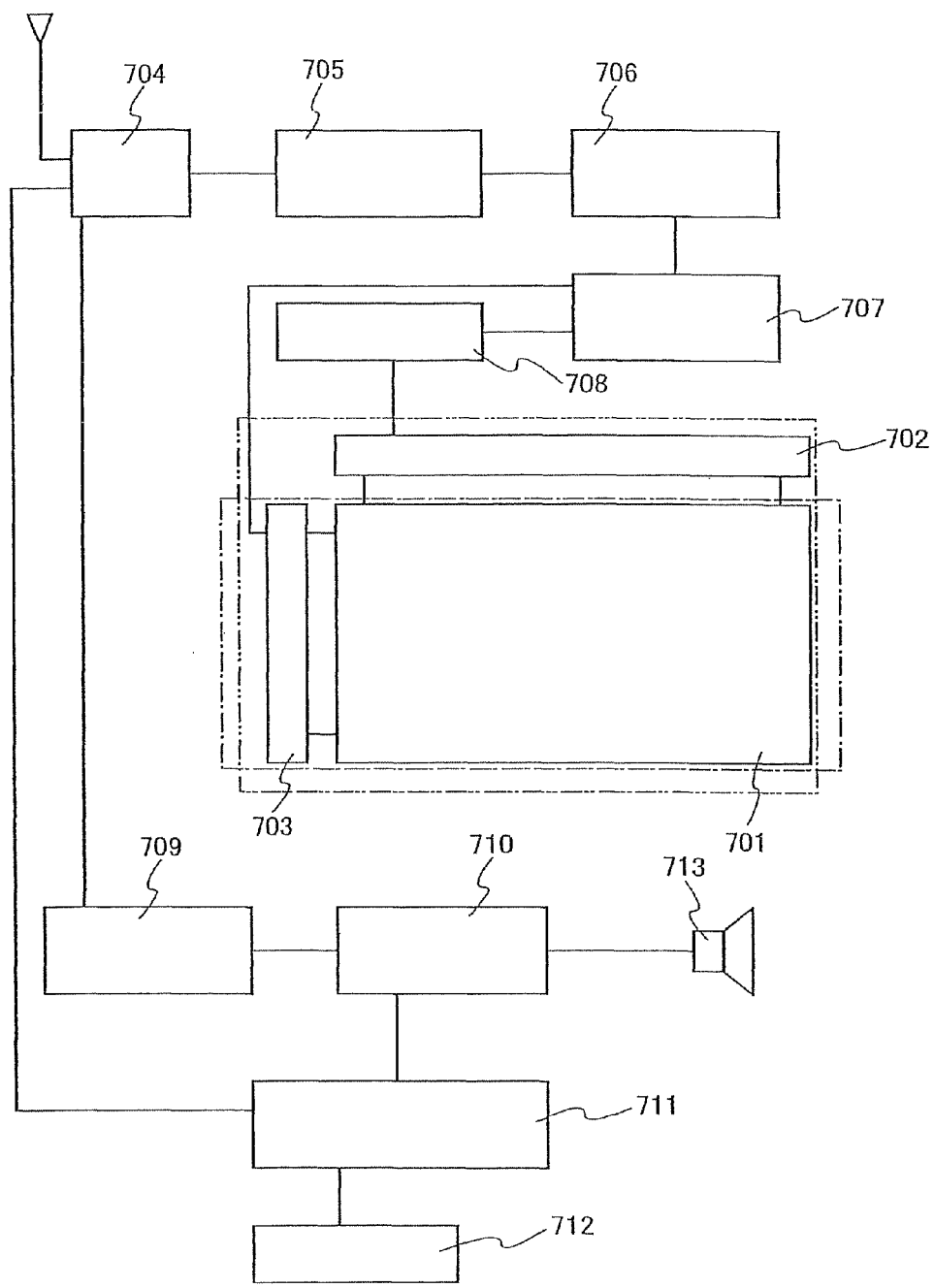
FIG. 20 is a block diagram showing a main structure of an electronic appliance to which the present invention can be applied.

With use of a display device formed by the present invention, a television device (also simply referred to as a television or a television receiver) can be completed. FIG. 20 is a block diagram of a main structure of a television device. A display panel can employ any one of the following structure: a structure shown in FIG. 16A in which only a pixel portion 701 is formed on the display panel and a scanning line driving circuit 703 and a signal line driving circuit 702 are mounted thereon by a TAB method shown in FIG. 17B, or by a COG method shown in FIG. 17A; a structure shown in FIG. 16B in which a TFT is formed, the pixel portion 701 and the scanning line driving circuit 703 are formed over a substrate, and the signal line driving circuit 702 is separately mounted as a driver IC, or a structure shown in FIG. 17C in which the pixel portion 701, the signal line driving circuit 702, and the scanning line driving circuit 703 are formed over the same substrate.

As another structure of an external circuit, an image signal amplifier circuit 705 which amplifies an image signal included in signals received by a tuner 704, an image signal processing circuit 706 which converts the signals outputted from the image signal amplifier circuit 705 into chrominance signals corresponding to colors of red, green, and blue, a control circuit 707 which converts the image signal into an input specification of a driver IC, and the like are provided on an input side of the image signal. The control circuit 707 outputs signals to both a scanning line side and a signal line side. In a case of digital driving, a structure in which a signal line dividing circuit 708 may be provided on the signal line side and an input digital signal may be divided into m pieces to be supplied may be employed.

An audio signal in signals received by the tuner 704 is sent to an audio signal amplifier circuit 709 and an output therefrom is supplied to a speaker 713 through an audio signal processing circuit 710. A controlling circuit 711 receives control information such as a receiving station (reception frequency) or sound volume from an input portion 712 and transmits signals to the tuner 704 or the audio signal processing circuit 710.

Figure 21A:
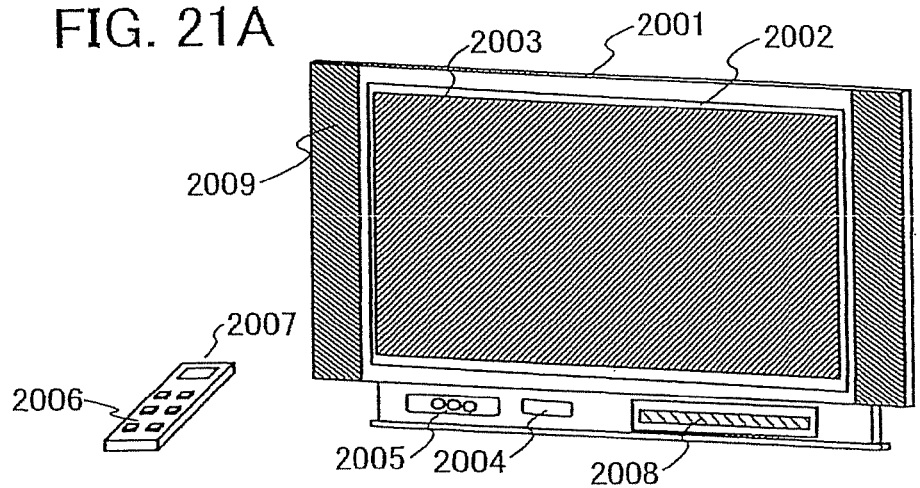
FIGS. 21A to 21C show electronic appliances of the present invention.
Figure 21B:
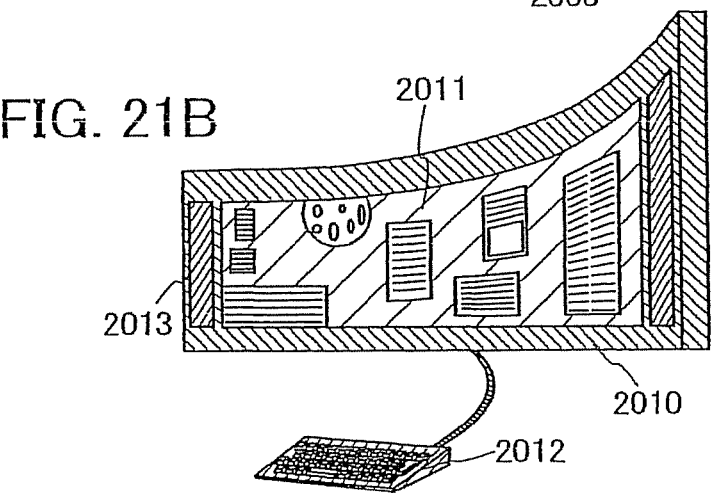
Figure 21C:
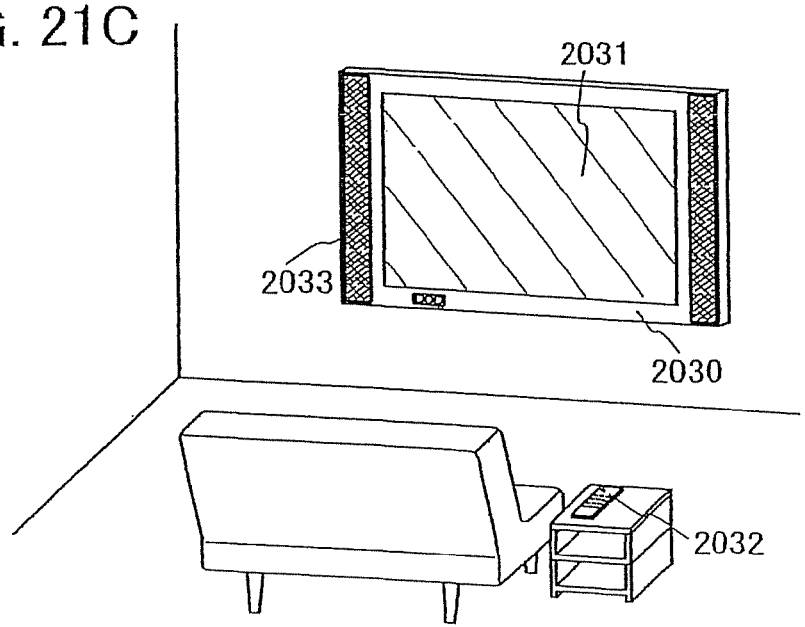

Such a liquid crystal display panel module is incorporated into each chassis as shown in FIGS. 21A to 21C, whereby a television device can be completed. In FIG. 21A, a main screen 2003 is formed by a display module and a speaker portion 2009, an operation switch, and the like are provided as accessories. In the foregoing manner, a television device can be completed by the present invention.

A display panel 2002 is incorporated in a chassis 2001. The television device can receive general TV broadcast by a receiver 2005 and further can be connected to a wired or wireless communication network via a modem 2004 so that one-way (from a sender to a receiver) or two-way (between a sender and a receiver or between receivers) information communication can be carried out. The television device can be operated by a switch of the chassis or a separate remote control unit 2006. The remote control unit may have a display portion 2007 which displays information to be outputted.

The television device may include a sub screen 2008 formed using a second display panel for display channels, volume, and the like, in addition to the main screen 2003. In this structure, the main screen 2003 and the sub screen 2008 may be formed with use of a panel for a liquid crystal display of the present invention. Alternatively, the main screen 2003 may be formed using a panel for an EL display having a superior viewing angle, and the sub screen may be formed using a panel for a liquid crystal display which can display an image with lower power consumption. Note that in order to reduce the power consumption preferentially, a structure in which the main screen 2003 is formed of a panel for a liquid crystal display, and the sub screen is formed of a panel for an EL display and can blink may be employed. With the present invention, a highly reliable display device can be manufactured even if a large substrate and a number of TFTs is and electronic parts are used.

FIG. 21B shows a television device having a large display portion of 20 to 80 inches, for example. The television device includes a chassis 2010, a key board portion 2012 which is an operation portion, a display portion 2011, a speaker portion 2013, and the like. The present invention is applied to manufacturing of the display portion 2011. Since a substance which can be curved is used in the display portion in FIG. 21B, a television device having a curved display portion is formed. In such a manner, a shape of a display portion can be freely designed; therefore, a television device with a desired shape can be manufactured.

FIG. 21C shows a television device having a large display portion of 20 to 80 inches, for example. The television device includes a chassis 2030, a display portion 2031, a remote control unit 2032 which is an operation portion, a speaker portion 2033, and the like. The present invention is applied to manufacturing of the display portion 2031. The television device shown in FIG. 21C is a wall-hanging type and does not require a large installation space.

It is needles to say that the present invention is not limited to a television device. The present invention can be applied to various applications such as a monitor of a personal computer, and particularly, a large display media typified by an information screen at train stations, airports, or the like, and an advertising display screen on the street.

Embodiment Mode 8

As electronic appliances relating to the present invention, a television device (also simply referred to as a television or a television receiver), a camera such as a digital camera and a digital video camera, a mobile phone device (also simply referred to as a mobile phone), a portable information terminal such as a PDA, a portable game machine, a monitor for a computer, a computer, an audio reproducing device such as a car audio set, an image reproducing device provided with a recording medium such as a home game machine, and the like can be given. Specific examples are described with reference to FIG. 22A to 22E.

Figure 22A:
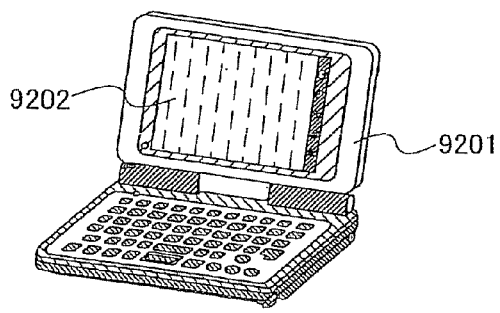
FIGS. 22A to 22E show electronic appliances of the present invention.

A portable information terminal shown in FIG. 22A includes a main body 9201, a display portion 9202, and the like. The display device of the present invention can be applied to the display portion 9202. Thus, a high performance portable information terminal which can display a high quality image with high reliability can be provided.

Figure 22B:
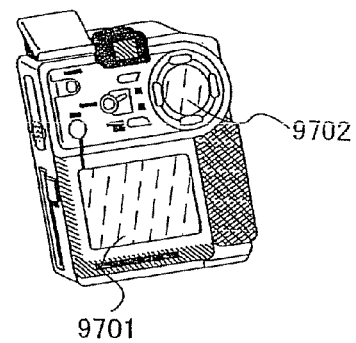

A digital video camera shown in FIG. 22B includes a display portion 9701, a display portion 9702, and the like. The display device of the present invention can be applied to the display portion 9701. Thus, a high performance digital video camera which can display a high quality image with high reliability can be provided.

Figure 22C:
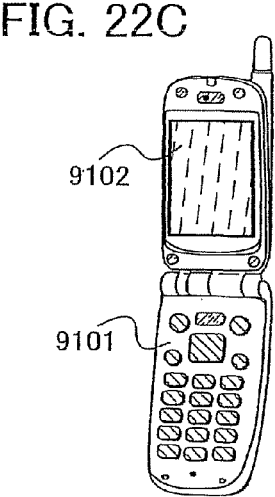

A mobile phone shown in FIG. 22C includes a main body 9101, a display portion 9102, and the like. The display device of the present invention can be applied to the display portion 9102. Thus, a high performance mobile phone which can display a high quality image with high reliability can be provided.

Figure 22D:
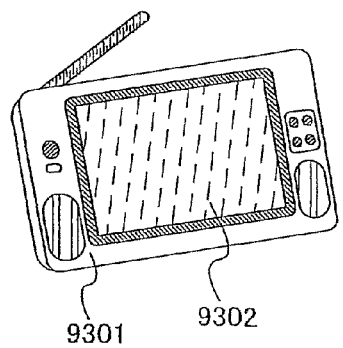

A portable television device shown in FIG. 22D includes a main body 9301, a display portion 9302, and the like. The display device of the present invention can be applied to the display portion 9302. Thus, a high performance portable television device which can display a high quality image with high reliability can be provided. In addition, a display device of the present invention can be widely applied, as a television device, to a small television, device mounted on a portable terminal such as a mobile phone, a medium one which can be carried, and a large one (for example, 40 inches or more).

Figure 22E:
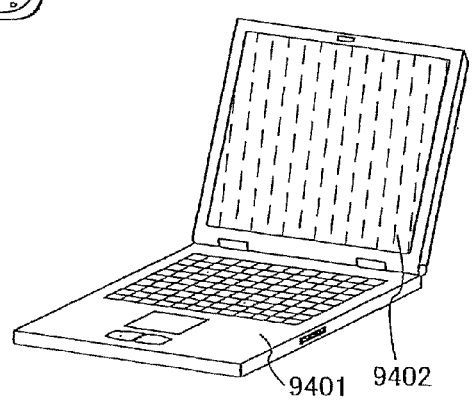

A portable computer shown in FIG. 22E includes a main body 9401, a display portion 9402, and the like. The display device of the present invention can be applied to the display portion 9402. Thus, a high performance portable computer which can display a high quality image with high reliability can be provided.

As described above, with a display device of the present invention, a high performance electronic appliance which can display a high quality image with high reliability can be provided.

Embodiment 1

In this embodiment, characteristics of a light emitting diode used in the present invention was measured and evaluated. Experimental result is described with reference to FIGS. 10A, 10B, and 12A to 13.

Figure 10A:
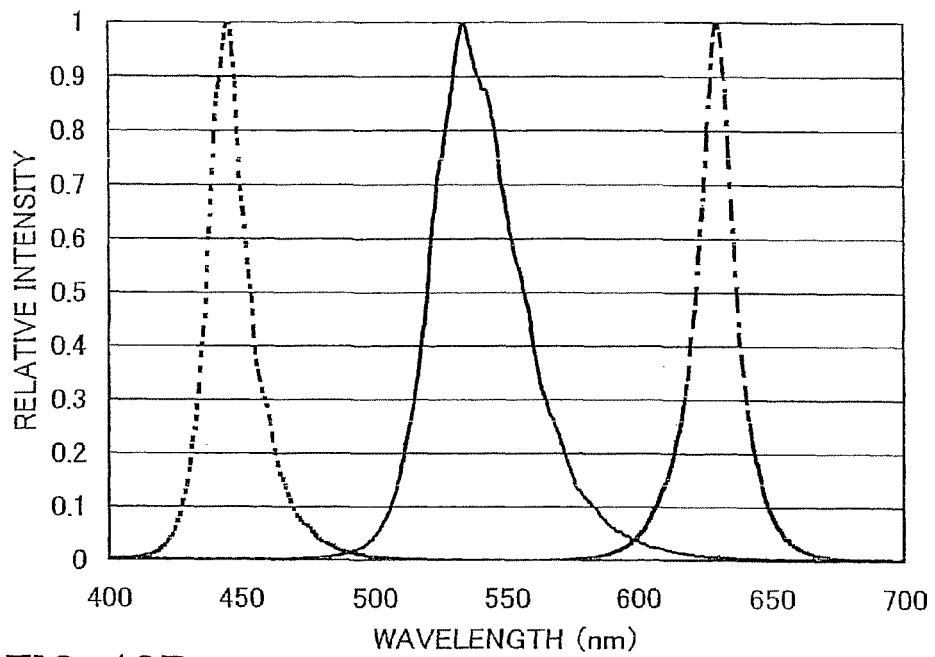
FIGS. 10A and 10B are graphs showing experimental data of Embodiment 1.
Figure 10B:
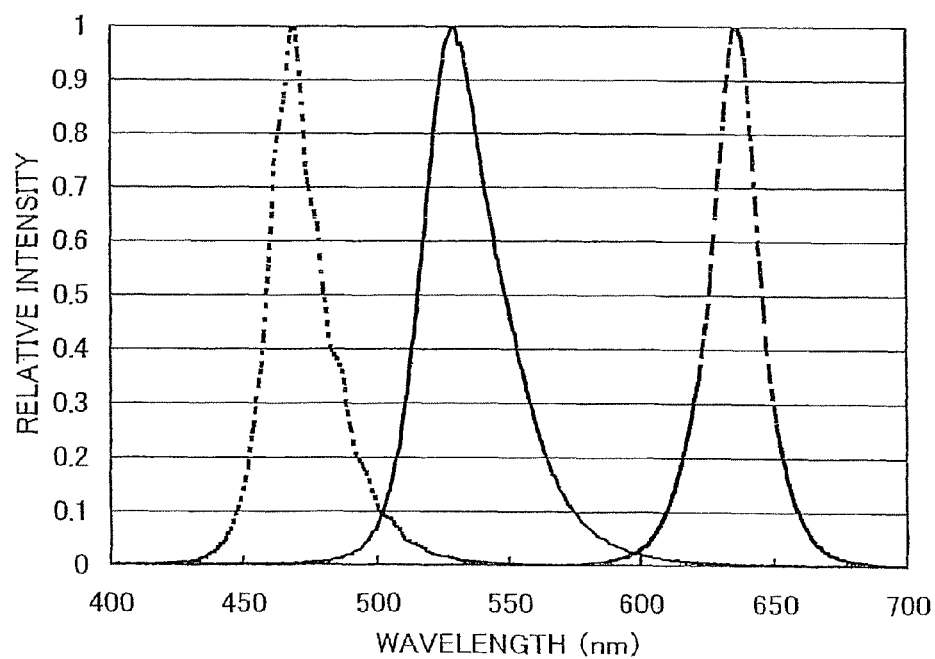

Emission spectra of light emitting diodes of RGB were measured with a spectrophotometer device which can measure a spectroscopy spectrum from ultraviolet to near-infrared. The result of the measurement is shown in FIGS. 10A and 10B. In FIGS. 10A and 10B, FIG. 10B shows a result of an emission spectrum with use of a light emitting diode which emits normal blue light, and FIG. 10A shows an emission spectrum with use of a dark blue light emitting diode which emits dark blue light, instead of the blue light emitting diode used in FIG. 10B. In FIGS. 10A and 10B, wavelength spectra of the blue light emitting diode and the dark blue light emitting diode are denoted by a dotted line, a wavelength spectrum of a green light emitting diode is denoted by a solid line, and a wavelength spectrum of a red light emitting diode is denoted by a dashed-single dotted line.

In a case where the dark blue light emitting diode was used, a peak position was shifted to a short wavelength side of 455 nm from a peak position of 470 nm in a case where the blue light emitting diode was used. Accordingly, an area overlapped with a spectrum of the green light emitting diode became small and the half width of the spectrum became narrow. Therefore, it was recognized that color purity was further heightened and a color reproducibility range was widened.

Figure 12A:
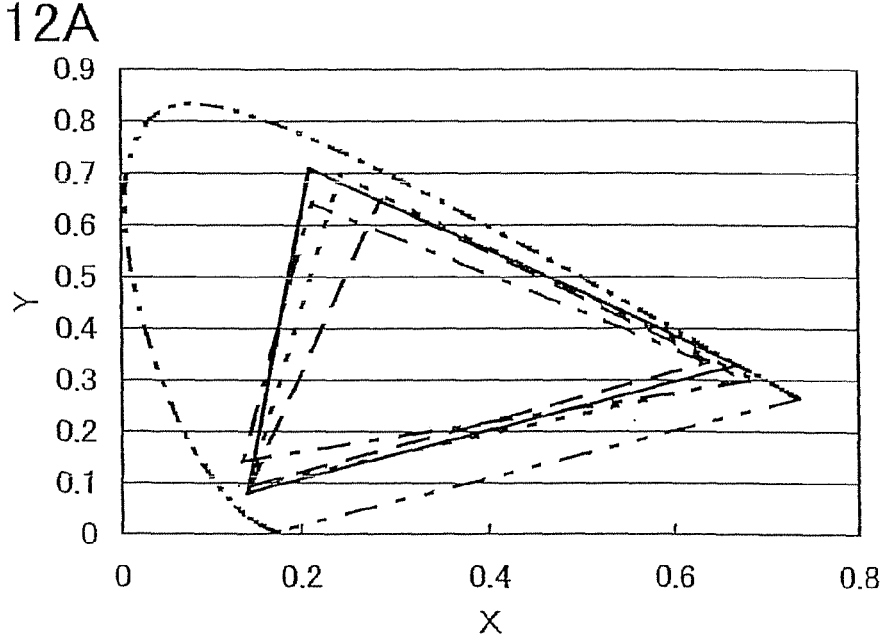
FIGS. 12A and 12B are graphs showing experimental data of Embodiment 1.
Figure 12B:
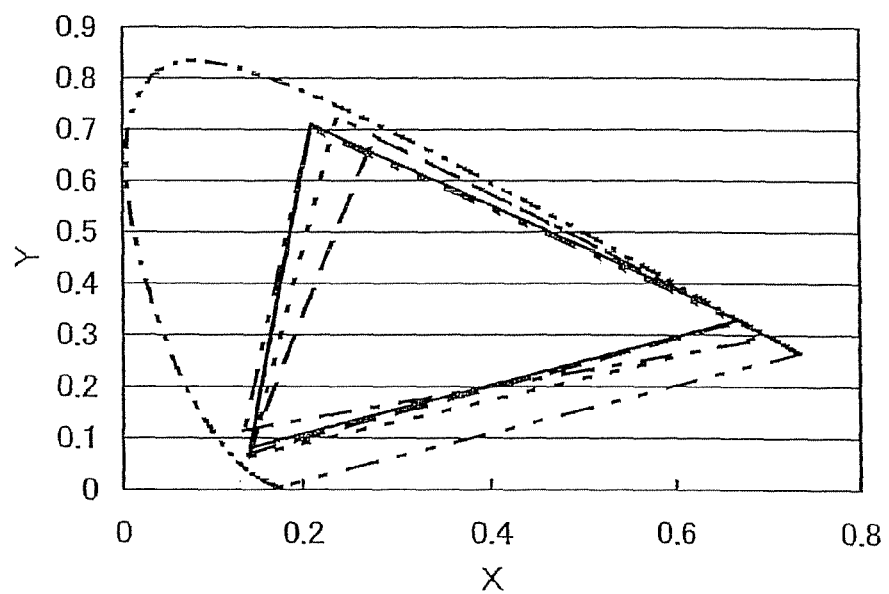
Figure 13:
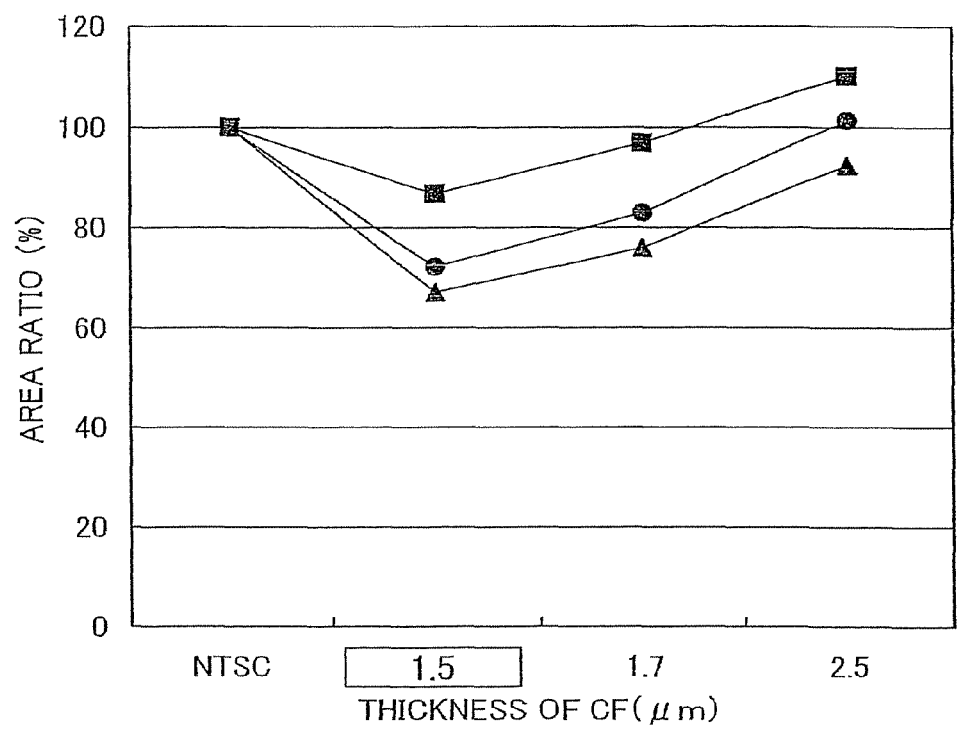
FIG. 13 is a graph showing experimental data of Embodiment 1.

A back light unit using a cold cathode fluorescent tube cold cathode fluorescent tube (also referred to as CCFL: Cold Cathode Fluorescent Lamp) as a light source, a back light unit using RGB light emitting diodes including the blue light emitting diode as a light source, and a back light unit using RGB light emitting diode including the dark blue light emitting diode were driven. Two color filters with different thicknesses (a film thickness of 1.7 μm and a film thickness of 2.5 μm) were located over each of the back light units, and chromaticity of each color of RGB was measured with a color luminance meter, under a condition in which white was adjusted to the chromaticity coordinates of the NTSC standard. The result of the measurement of chromaticity coordinates is shown in FIGS. 12A and 12B. In FIGS. 12A and 12B, chromaticity coordinate of NTSC is denoted by a solid line, that of the RGB light emitting diode including the blue light emitting diode is denoted by a dashed-single dotted line, that of the RGB light emitting diode including the dark blue light emitting diode is denoted by a dotted line, and that of the CCFL is denoted by a dashed line. FIG. 12A shows chromaticity coordinates when the color filter with a thickness of 1.7 μm was used and FIG. 12B shows chromaticity coordinates when the color filter with a thickness of 2.5 μm was used.

When the area of the chromaticity coordinates of the NTSCC is regarded as 100%, the area of the chromaticity coordinates of a case of using the cold cathode fluorescent tube is 67 to 92%, that of a case of using the blue light emitting diode is 72 to 101%, and that of a case of using the dark blue light emitting diode is 87 to 110%. Accordingly, it was recognized that when the dark blue light emitting diode is used, an area of chromaticity coordinates can become large.

As described above, when a backlight device uses a light emitting diode as its light source, a color reproducibility range can be widened. Therefore, with use of such a backlight device, a high performance display device which can display a higher quality image can be manufactured.

Embodiment 2

In this embodiment, characteristics of a light emitting diode of the present invention was measured and evaluated. The experimental result is described with reference to FIGS. 11A to 11C.

Figure 11A:
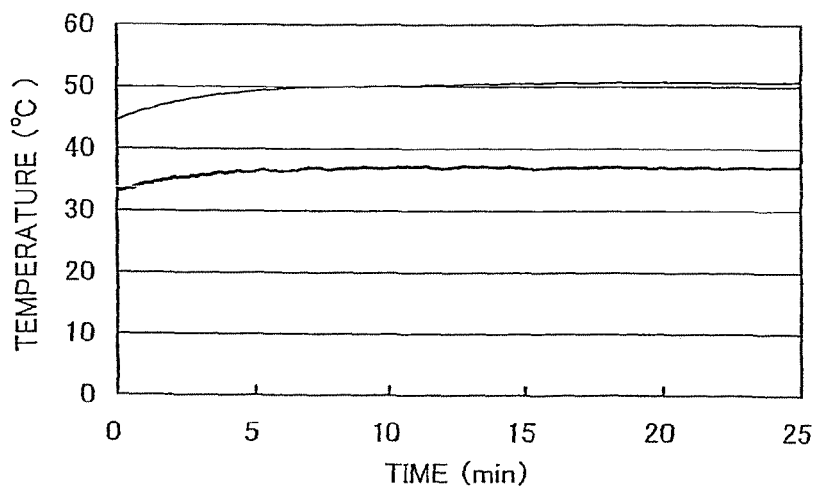
FIGS. 11A to 11C are graphs showing experimental data of Embodiment 2.
Figure 11B:
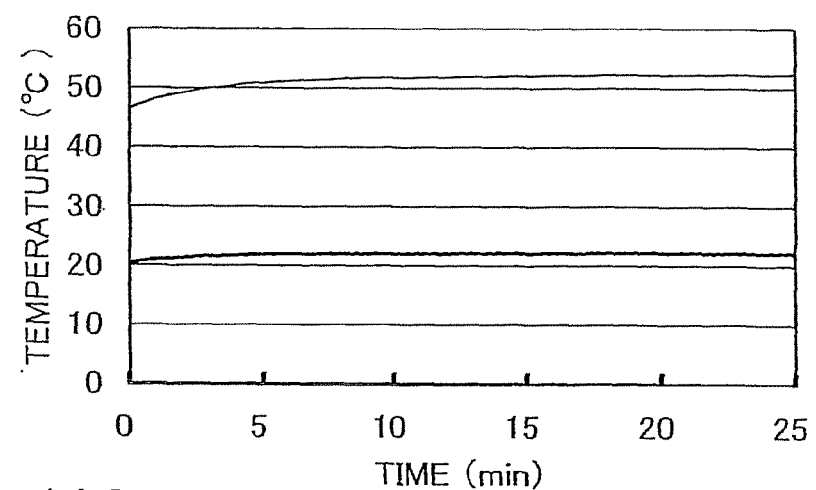
Figure 11C:
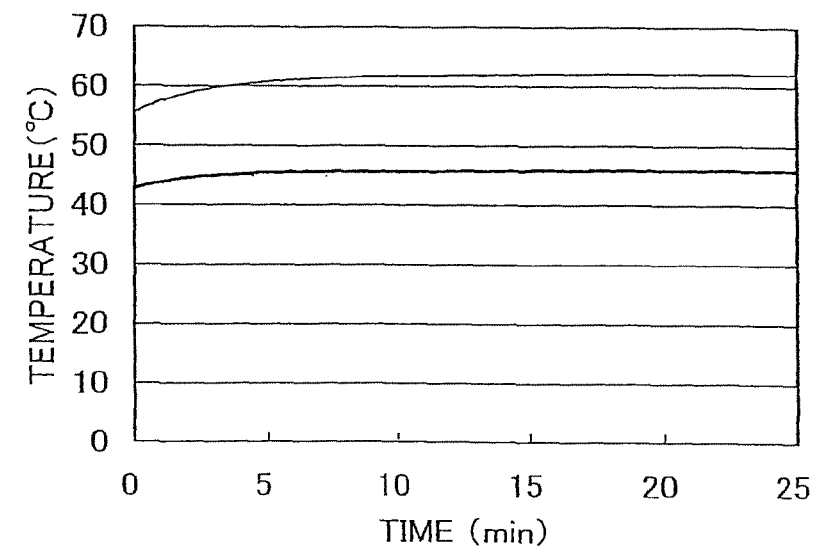

Change in temperature in a backlight device when a light emitting diode blinked was measured in a case where a measure for releasing heat was not taken for the light emitting diode and in a case where the light emitting diode was provided in a chassis having a thermoelectric element according to the present invention and cooling was carried out by the thermoelectric element. In specific, a temperature of a back surface of a substrate (metal core substrate), a temperature of a front surface of the substrate (metal core substrate), and a temperature of a vicinity of a resin covering the light emitting diode were measured with a thermocouple. The temperature change with time of the front surface of the substrate is shown in FIG. 11A, that of the back surface of the substrate is shown in FIG. 11B, and that of the vicinity of the resin covering the light emitting diode is shown in FIG. 11C. In FIGS. 11A to 11C, the case where the measure for releasing heat by the thermoelectric element was not taken is denoted by a thin line and the case where the measure for releasing heat by the thermoelectric element was taken is denoted by a thick line. In this embodiment, a Peltier element was used as a thermoelectric element.

In a case where a measure for releasing heat was not taken, a temperature of the substrate was 50° C. (both the back surface and the front surface) and that in the vicinity of the light emitting diode (the vicinity of the resin covering the light emitting diode) was 60° C. On the other hand, in a case where the Peltier element was used, a temperature of the back surface of the metal core substrate was 20° C., that of the front surface of the metal core substrate was 40° C., and that in the vicinity of the light emitting diode (the vicinity of the resin covering the light emitting diode) was 45° C. Accordingly, it was recognized that the temperature of the light emitting diode in use became low in a case where the Peltier element was used.

As described above, with the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

Embodiment 3

In this embodiment, characteristics of a light emitting diode of the present invention was measured and evaluated. The experimental result is described with reference to FIGS. 26A to 28B.

Change in temperature in a backlight device when a light emitting diode blinked was measured in a case where the light emitting diode was provided in a chassis having a thermoelectric element and cooling was carried out by the thermoelectric element. In specific, a temperature of a vicinity of a resin covering the light emitting diode was measured with a thermocouple.

Figure 27A:
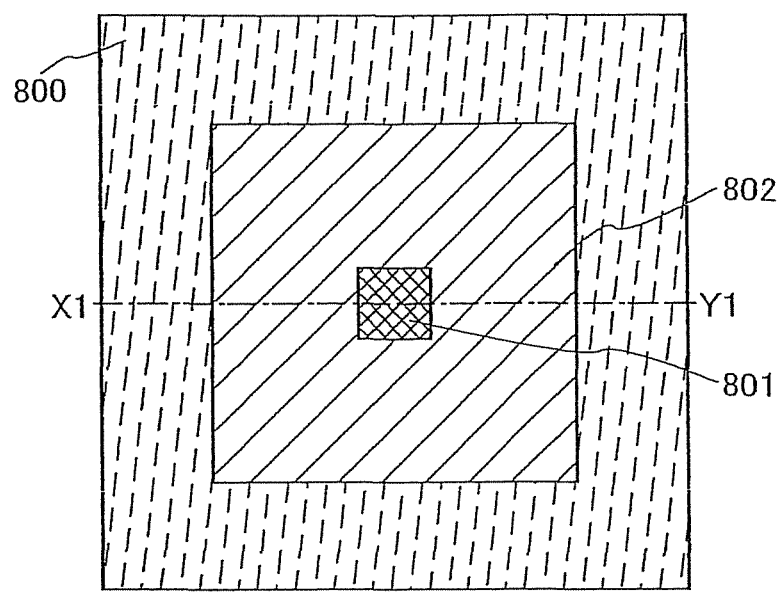
FIGS. 27A and 27B show experimental condition of Embodiment 3.
Figure 27B:
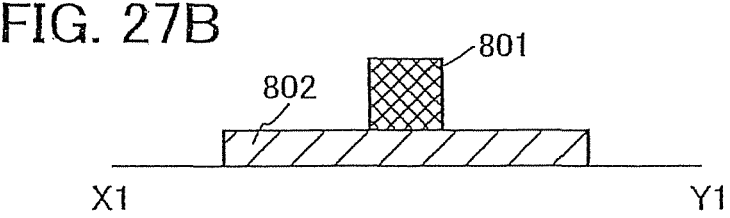
Figure 28A:
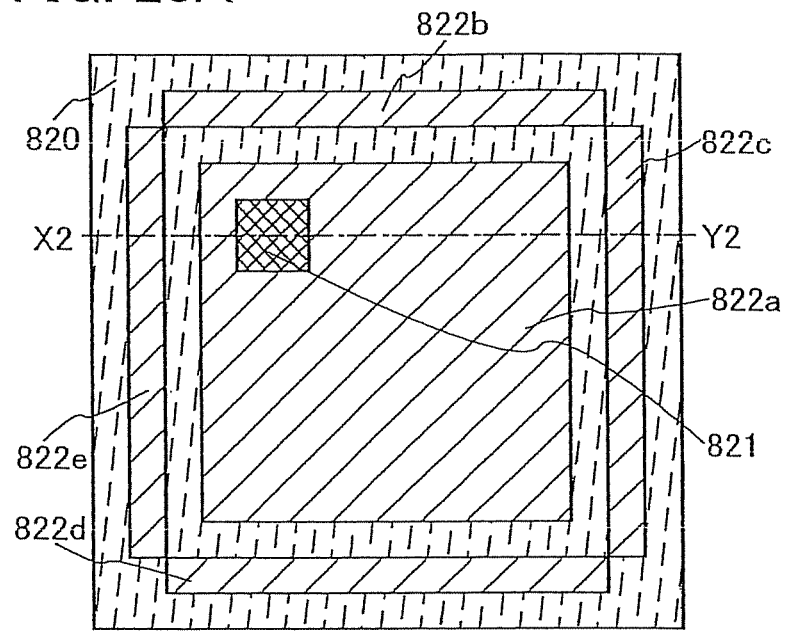
FIGS. 28A and 28B show experimental condition of Embodiment 3.
Figure 28B:
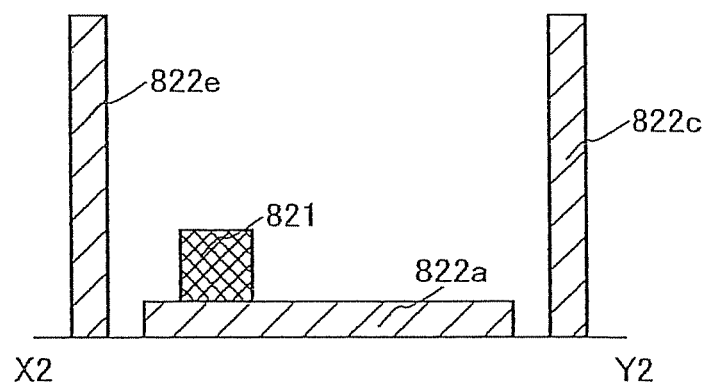

Samples are sample A (A1 to A3) and sample B (B1 to B3) and they have different locations of the thermoelectric elements with respect to the light emitting diodes. FIGS. 27A to 28B show structures of sample A and sample B. In FIGS. 27A to 28B, FIGS. 27A and 28A are top views, FIG. 27B is a cross-sectional view taking along a line X1-Y1 in FIG. 27A, and FIG. 28B is a cross-sectional view taking along a line X2-Y2 in FIG. 28A. Sample A has a structure in which a thermoelectric element 802 is provided only under a light emitting diode 801 in a chassis 800 and the light emitting diode 801 is provided in the center of the chassis 800 (FIGS. 27A and 27 Sample B has a structure in which a thermoelectric element 822a is provided under a light emitting diode 821 and thermoelectric elements 822b to 822e are provided so as to surround four sides of the light emitting diode 821 in a chassis 820, and the light emitting diode 821 is not provided in the center of the thermoelectric element 822a but near the thermoelectric elements 822b and 822e (FIGS. 28A and 28B).

Sample A1 and sample B1 are light emitting diodes which emit red light, sample A2 and sample B2 are light emitting diodes which emit green light, and sample A3 and sample B3 are light emitting diodes which emit blue (royal blue).

Figure 26A:
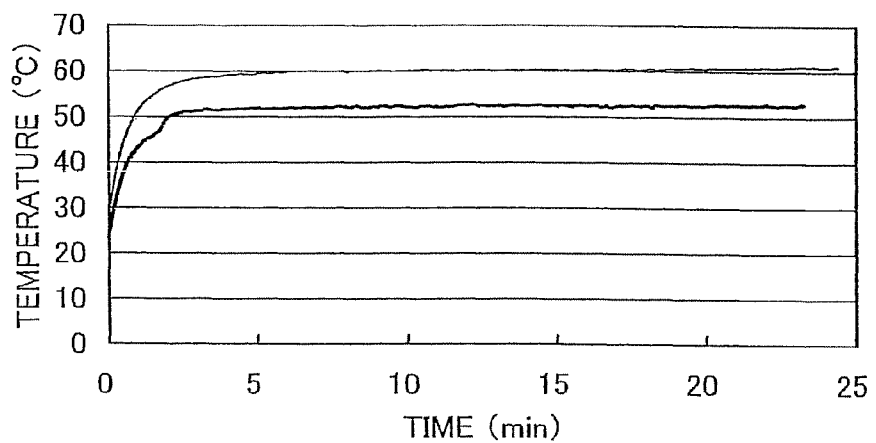
FIGS. 26A to 26C are graphs showing experimental data of Embodiment 3.
Figure 26B:
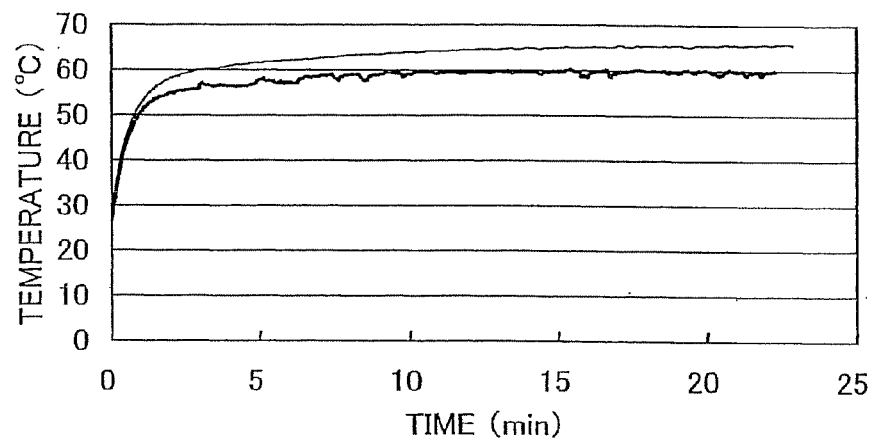
Figure 26C:
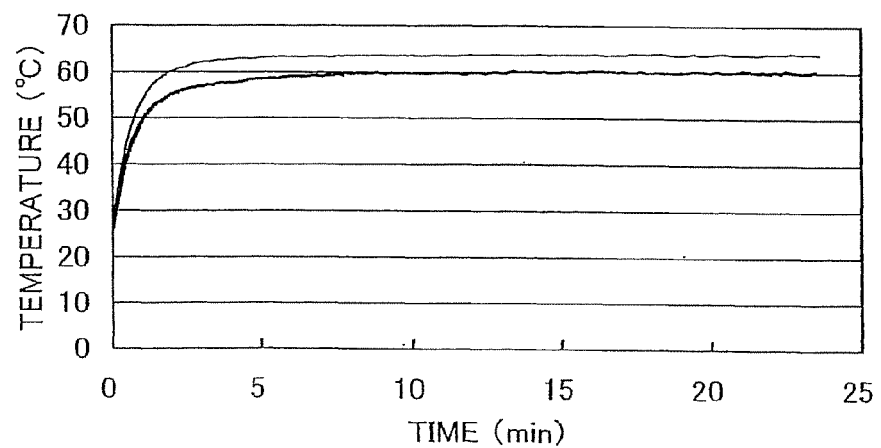

FIG. 26A shows the temperature changes with time in the vicinity of the resin covering sample A1 and sample B1 which are light emitting diodes exhibiting red light emission, FIG. 26B shows the temperature changes with time in the vicinity of the resin covering sample A2 and sample B2 which are light emitting diodes exhibiting green light emission, and FIG. 26C shows the temperature changes with time in the vicinity of the resin covering sample A3 and sample B3 which are light emitting diodes exhibiting blue light emission. In FIGS. 26A to 26C, sample A (A1, A2, A3) is denoted by a thin line and sample B (B1, B2, B3) is denoted by a thick line. In sample A and sample B, a Peltier element was used as the thermoelectric element. In all samples, a current of 0.3 ampere (A) is supplied to the light emitting diode and a current of 2 ampere (A) is supplied to the thermoelectric element.

As shown in FIGS. 26A to 26C, increase in temperature was suppressed in samples B1 to B3 in which the thermoelectric elements were provided to five sides of the light emitting diode of the present invention so as to surround the light emitting diode, compared with samples A1 to A3 in which the thermoelectric element was provided only under the light emitting diode. Accordingly, a structure like the present invention in which thermoelectric elements are provided so as to surround the light emitting diode has high heat releasing effect on the light emitting diode.

As described above, with the present invention, heat generation of the light emitting diode used in the light source can be suppressed; therefore, reduction in life time and luminance, and chromaticity shift of the light emitting diode can be suppressed. Since heat generation in the light source is suppressed, transformation and alteration of a diffusing film, a reflective film, and a prism film can also be suppressed.

Furthermore, change in characteristics of the liquid crystal display panel, such as response speed, contrast, or color unevenness can be suppressed. In addition, transformation, alteration, deterioration in characteristics, or the like of a polarizing film, a wide view film, a retardation film, and the like used in the liquid crystal display panel can also be suppressed. Also, since a heat sink, a heat pipe, a cooling fan, and the like are not required, the backlight device can be thinned.

Therefore, with the present invention, a highly reliable backlight device with less color unevenness and less luminance unevenness, and a high-performance and highly reliable display device including the backlight device, which can display a high quality image, can be manufactured.

This application is based on Japanese Patent Application serial no. 2006-077879 filed in Japan Patent Office on Mar. 21, 2006, the entire contents of which are hereby incorporated by reference.

What is claimed is:

1. A semiconductor device comprising:
    a liquid crystal display panel; and
    a backlight device adjacent to the liquid crystal display panel,
    wherein the liquid crystal display panel comprises:
        a transistor; and
        a sealant,
    wherein the backlight device comprises:
        a board;
        a reflective sheet over the board;
        a first light emitting part over the board;
        a second light emitting part over the board;
        a third light emitting part over the board;
        a diffusing plate over the reflective sheet, the first light emitting part, the second light emitting part and the third light emitting part; and
        a prism sheet over the diffusing plate,
    wherein the first light emitting part, the second light emitting part and the third light emitting part each comprises:
        a plurality of light emitting diodes; and
        a fluorescent material over the plurality of light emitting diodes,
    wherein the transistor overlaps with the first light emitting part, and
    wherein the sealant does not overlap with the first light emitting part, the second light emitting part and the third light emitting part.

2. A semiconductor device according to claim 1, wherein the first light emitting part, the second light emitting part and the third light emitting part emit red light, green light and blue light, respectively.

3. A semiconductor device according to claim 1, wherein the first light emitting part, the second light emitting part and the third light emitting part each emits white light.

4. A semiconductor device according to claim 1, wherein colors of the plurality of light emitting diodes of the first light emitting part are different each other.

5. A semiconductor device according to claim 1,
    wherein the transistor does not overlap with the second light emitting part.

6. A semiconductor device according to claim 1,
    wherein the transistor does not overlap with the third light emitting part.

7. An electric appliance comprising a semiconductor device according to claim 1, wherein the electric appliance comprises one selected from the group consisting of a portable information terminal, a camera, a mobile phone, a television device, and a computer.

8. An electric appliance comprising a semiconductor device according to claim 1, a speaker and a remote control unit.

9. A semiconductor device comprising:
    a liquid crystal display panel; and
    a backlight device adjacent to the liquid crystal display panel,
    wherein the liquid crystal display panel comprises:
        a pixel electrode layer; and
        a sealant,
    wherein the backlight device comprises:
        a board;
        a reflective sheet over the board;
        a first light emitting part over the board;

a second light emitting part over the board;
a third light emitting part over the board;
a diffusing plate over the reflective sheet, the first light emitting part, the second light emitting part and the third light emitting part; and
a prism sheet over the diffusing plate,
wherein the first light emitting part and the second light emitting part each comprises:
a plurality of light emitting diodes; and
a fluorescent material over the plurality of light emitting diodes,
wherein the pixel electrode layer overlaps with the third light emitting part, and
wherein the sealant does not overlap with the first light emitting part, the second light emitting part and the third light emitting part.

10. A semiconductor device according to claim 9, wherein the first light emitting part, the second light emitting part and the third light emitting part emit red light, green light and blue light, respectively.

11. A semiconductor device according to claim 9, wherein the first light emitting part, the second light emitting part and the third light emitting part each emits white light.

12. A semiconductor device according to claim 9, wherein colors of the plurality of light emitting diodes of the first light emitting part are different each other.

13. A semiconductor device according to claim 9,
wherein the liquid crystal display panel comprises a transistor, and
wherein the transistor overlaps with the first light emitting part.

14. A semiconductor device according to claim 9,
wherein the liquid crystal display panel comprises a transistor, and
wherein the transistor does not overlap with the second light emitting part.

15. A semiconductor device according to claim 9,
wherein the liquid crystal display panel comprises a transistor, and
wherein the transistor does not overlap with the third light emitting part.

16. A semiconductor device according to claim 9,
wherein the pixel electrode layer does not overlap with the first light emitting part.

17. A semiconductor device according to claim 9, wherein the pixel electrode layer does not overlap with the second light emitting part.

18. An electric device comprising a semiconductor device according to claim 9, wherein the electric device is one selected from the group consisting of a portable information terminal, a camera, a mobile phone, a television device, and a computer.

19. An electric appliance comprising a semiconductor device according to claim 9, a speaker and a remote control unit.

20. A semiconductor device comprising:
a liquid crystal display panel; and
a backlight device adjacent to the liquid crystal display panel,
wherein the liquid crystal display panel comprises:
a capacitor; and
a sealant,
wherein the backlight device comprises:
a board;
a reflective sheet over the board;
a first light emitting part over the board;
a second light emitting part over the board;
a third light emitting part over the board;
a diffusing plate over the reflective sheet, the first light emitting part, the second light emitting part and the third light emitting part; and
a prism sheet over the diffusing plate,
wherein the first light emitting part and the second light emitting part each comprises:
a plurality of light emitting diodes; and
a fluorescent material over the plurality of light emitting diodes,
wherein the capacitor overlaps with the third light emitting part, and
wherein the sealant does not overlap with the first light emitting part, the second light emitting part and the third light emitting part.

21. A semiconductor device according to claim 20, wherein the first light emitting part, the second light emitting part and the third light emitting part emit red light, green light and blue light, respectively.

22. A semiconductor device according to claim 20, wherein the first light emitting part, the second light emitting part and the third light emitting part each emits white light.

23. A semiconductor device according to claim 20, wherein colors of the plurality of light emitting diodes of the first light emitting part are different each other.

24. A semiconductor device according to claim 20,
wherein the liquid crystal display panel comprises a transistor, and
wherein the transistor overlaps with the first light emitting part.

25. A semiconductor device according to claim 20,
wherein the liquid crystal display panel comprises a transistor, and
wherein the transistor does not overlap with the second light emitting part.

26. A semiconductor device according to claim 20,
wherein the liquid crystal display panel comprises a transistor, and
wherein the transistor does not overlap with the third light emitting part.

27. A semiconductor device according to claim 20,
wherein the capacitor does not overlap with the first light emitting part.

28. A semiconductor device according to claim 20,
wherein the capacitor does not overlap with the second light emitting part.

29. An electric device comprising a semiconductor device according to claim 20, wherein the electric device is one selected from the group consisting of a portable information terminal, a camera, a mobile phone, a television device, and a computer.

30. An electric appliance comprising a semiconductor device according to claim 20, a speaker and a remote control unit.

31. A semiconductor device comprising:
a liquid crystal display panel; and
a backlight device adjacent to the liquid crystal display panel,
wherein the liquid crystal display panel comprises:
a substrate and a counter substrate;
a pixel electrode layer over the substrate;
a spacer between the substrate and the counter substrate; and
a sealant between the substrate and the counter substrate,
wherein the backlight device comprises:
a board;
a reflective sheet over the board;

a first light emitting part over the board;
a second light emitting part over the board;
a third light emitting part over the board;
a diffusing plate over the reflective sheet, the first light emitting part, the second light emitting part and the third light emitting part; and
a prism sheet over the diffusing plate,
wherein the first light emitting part and the second light emitting part each comprises:
a plurality of light emitting diodes; and
a fluorescent material over the plurality of light emitting diodes,
wherein at least a part of the spacer overlaps with the pixel electrode layer, and
wherein the sealant does not overlap with the first light emitting part, the second light emitting part and the third light emitting part.

32. A semiconductor device according to claim 31, wherein the first light emitting part, the second light emitting part and the third light emitting part emit red light, green light and blue light, respectively.

33. A semiconductor device according to claim 31, wherein the first light emitting part, the second light emitting part and the third light emitting part each emits white light.

34. A semiconductor device according to claim 31, wherein colors of the plurality of light emitting diodes of the first light emitting part are different each other.

35. An electric device comprising a semiconductor device according to claim 31, wherein the electric device is one selected from the group consisting of a portable information terminal, a camera, a mobile phone, a television device, and a computer.

36. An electric appliance comprising a semiconductor device according to claim 31, a speaker and a remote control unit.

37. A semiconductor device comprising:
a liquid crystal display panel; and
a backlight device adjacent to the liquid crystal display panel,
wherein the liquid crystal display panel comprises:
a substrate and a counter substrate;
a pixel electrode layer over the substrate;
a spacer between the substrate and the counter substrate; and
a sealant between the substrate and the counter substrate,
wherein the backlight device comprises:
a board;
a reflective sheet over the board;
a first light emitting part over the board;
a second light emitting part over the board;
a third light emitting part over the board;
a diffusing plate over the reflective sheet, the first light emitting part, the second light emitting part and the third light emitting part; and
a prism sheet over the diffusing plate,
wherein the first light emitting part and the second light emitting part each comprises:
a plurality of light emitting diodes; and
a fluorescent material over the plurality of light emitting diodes,
wherein at least a part of the spacer does not overlap with the pixel electrode layer, and
wherein the sealant does not overlap with the first light emitting part, the second light emitting part and the third light emitting part.

38. A semiconductor device according to claim 37, wherein the first light emitting part, the second light emitting part and the third light emitting part emit red light, green light and blue light, respectively.

39. A semiconductor device according to claim 37, wherein the first light emitting part, the second light emitting part and the third light emitting part each emits white light.

40. A semiconductor device according to claim 37, wherein colors of the plurality of light emitting diodes of the first light emitting part are different each other.

41. An electric device comprising a semiconductor device according to claim 37, wherein the electric device is one selected from the group consisting of a portable information terminal, a camera, a mobile phone, a television device, and a computer.

42. An electric appliance comprising a semiconductor device according to claim 37, a speaker and a remote control unit.

* * * * *

UNITED STATES PATENT AND TRADEMARK OFFICE
CERTIFICATE OF CORRECTION

| | | |
|---|---|---|
| PATENT NO. | : 8,733,959 B2 | Page 1 of 1 |
| APPLICATION NO. | : 13/611411 | |
| DATED | : May 27, 2014 | |
| INVENTOR(S) | : Koji Moriya and Takeshi Nishi | |

It is certified that error appears in the above-identified patent and that said Letters Patent is hereby corrected as shown below:

In the Specification:

Column 1, Line 56; Change "output. RGB" to --output RGB--.

Column 2, Line 23; Change "referred, to" to --referred to--.

Column 5, Line 49; Change "backlight. device" to --backlight device--.

Column 6, Line 5; Change "element Since" to --element. Since--.

Column 6, Line 11; Change "diode, having" to --diode having--.

Column 8, Line 59; Change "a. retardation" to --a retardation--.

Column 10, Line 28; Change "measured, by" to --measured by--.

Column 11, Line 57; Change "(ROB)," to --(RGB),--.

Column 11, Line 58; Change "ROB" to --RGB--.

Column 12, Line 25; Change "fowled" to --formed--.

Column 12, Line 54; Change "fowled" to --formed--.

Column 12, Line 62; Change "substrate. 600," to --substrate 600,--.

Column 13, Line 42; Change "material 1 may" to --material may--.

Column 13, Line 45; Change "amid;" to --amide,--.

Column 13, Line 57; Change "fainted" to --formed--.

Column 17, Line 8; Change "composition. by" to --composition by--.

Column 17, Line 22; Change "in" to --In--.

Column 19, Line 34; Change "Light" to --light--.

Column 23, Line 52; Change "TFTs is and" to --TFTs and--.

Column 24, Line 50; Change "television, device" to --television device--.

Signed and Sealed this
Twenty-third Day of September, 2014

Michelle K. Lee
*Deputy Director of the United States Patent and Trademark Office*